(12) United States Patent
Cho

(10) Patent No.: US 11,966,529 B2
(45) Date of Patent: Apr. 23, 2024

(54) TOUCH DETECTION DEVICE, DISPLAY DEVICE INCLUDING THE SAME, AND METHOD FOR MANUFACTURING THE SAME

(71) Applicant: Samsung Display Co., Ltd., Yongin-Si (KR)

(72) Inventor: Mae Um Cho, Seongnam-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/196,437

(22) Filed: May 12, 2023

(65) Prior Publication Data
US 2023/0280855 A1 Sep. 7, 2023

Related U.S. Application Data

(63) Continuation of application No. 17/689,035, filed on Mar. 8, 2022, now Pat. No. 11,669,183.

(30) Foreign Application Priority Data

Aug. 2, 2021 (KR) .................. 10-2021-0101327

(51) Int. Cl.
*G06F 3/041* (2006.01)
*G06F 3/044* (2006.01)

(52) U.S. Cl.
CPC .......... *G06F 3/0412* (2013.01); *G06F 3/0416* (2013.01); *G06F 3/0446* (2019.05); *G06F 2203/04112* (2013.01)

(58) Field of Classification Search
CPC . G06F 2203/04103; G06F 2203/04111; G06F 2203/04112; G06F 3/0412; G06F 3/0416; G06F 3/0443; G06F 3/0446; G06F 3/0448
See application file for complete search history.

(56) References Cited

U.S. PATENT DOCUMENTS

2020/0089351 A1 3/2020 Jeong et al.
2022/0187948 A1 6/2022 Gwon et al.

FOREIGN PATENT DOCUMENTS

| KR | 10-2011-0025374 A | 3/2011 |
|----|-------------------|--------|
| KR | 10-1926512 B1 | 12/2018 |
| KR | 10-2021-0008201 A | 1/2021 |
| KR | 10-2021-0013449 A | 2/2021 |
| KR | 10-2021-0056468 A | 5/2021 |

*Primary Examiner* — Robin J Mishler
(74) *Attorney, Agent, or Firm* — Innovation Counsel LLP

(57) ABSTRACT

The present disclosure relates to a touch detection device, a display device including the same, and a method for manufacturing the same capable of minimizing an area of an outer area of a touch detection area or making the area of the outer area zero by changing disposition positions of touch driving lines and touch detection lines. The touch detection device comprising touch driving lines and touch detection lines, a driving electrode and a detection electrode disposed on the touch driving lines and the touch detection lines to overlap the touch driving lines and the touch detection lines.

7 Claims, 21 Drawing Sheets

TOUCH DETECTION DEVICE, DISPLAY DEVICE INCLUDING THE SAME, AND METHOD FOR MANUFACTURING THE SAME

CROSS-REFERENCE TO RELATED APPLICATION

This application is a continuation application of U.S. patent application Ser. No. 17/689,035 filed on Mar. 8, 2022, which claims priority to Korean Patent Application No. 10-2021-0101327 filed on Aug. 2, 2021, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a touch detection device, a display device including the same, and a method for manufacturing the same.

2. Description of the Related Art

As the information society develops, the demand for display devices for displaying images has increased and diversified. For example, display devices have been applied to various electronic devices such as smartphones, digital cameras, laptop computers, navigation devices, and smart televisions.

Among the display devices, an organic light emitting display device displays an image using an organic light emitting element generating light. The organic light emitting display device has a fast response speed, a high luminance and a wide viewing angle, and is driven with low power consumption.

The display device such as the organic light emitting display device includes a touch detector for detecting a user's touch, as one of input device. The touch detector detects the user's touch using touch electrodes driven in a capacitive manner.

In the touch detector, touch detection electrodes are disposed in a touch detection area, and lines through which driving signals or detection signals of the touch detection electrodes are transmitted are disposed in an outer area defined as a bezel area. An area of the outer area could not detect a user's touch but increases due to the lines connected to the touch detection electrodes.

SUMMARY

Aspects of the present disclosure provide a touch detection device capable of minimizing an area of an outer area of a touch detection area or making the area of the outer area zero by changing disposition positions of touch driving lines and touch detection lines.

Aspects of the present disclosure also provide a touch detection device and a display device capable of decreasing a size of a bezel without deteriorating luminous efficiency by improving a disposition structure of touch driving electrode and detection electrodes, and touch driving lines and detect lines.

Aspects of the present disclosure also provide a method for manufacturing a touch detection device capable of minimizing an area of an outer area of a touch detection area or making the area of the outer area zero.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the disclosure, A touch detection device comprising touch driving lines and touch detection lines disposed on a first touch insulating layer in a touch detection area, a second touch insulating layer formed on the touch driving lines and the touch detection lines, a connection electrode disposed on the second touch insulating layer, a third touch insulating layer formed on the connection electrodes, a driving electrode disposed on the third touch insulating layer and connected to any one of the touch driving lines through a first contact hole formed through the second and third touch insulating layers, and a detection electrode disposed on the third touch insulating layer and connected to any one of the touch detection lines through a second contact hole formed through the second and third touch insulating layers.

In an embodiment, the driving electrode or the detection electrode is connected to the connection electrode through a touch contact hole formed through the third touch insulating layer.

In an embodiment, at least one guard line disposed between a touch driving line and a touch detection line disposed adjacent to each other in a plan view.

In an embodiment, the touch detection device may further include a dummy electrode disposed between the driving electrode and the detection electrode. The touch driving lines, the touch detection lines, the at least one guard line, the driving electrode, the detection electrode, the connection electrode, and the dummy electrode do not overlap each of light emitting parts disposed under the touch detection area.

In an embodiment, a size and a shape of a mesh structure of the driving electrode, the detection electrode, the connection electrode, and the dummy electrode are the same as a size and a shape of a mesh structure of the touch driving lines, the touch detection lines, and the at least one guard line.

In an embodiment, the driving electrode and the detection electrode overlap the touch driving lines, the touch detection lines, and the at least one guard line in a plan view with at least one of the second and third touch insulating layers interposed therebetween.

In an embodiment, one ends of the touch driving lines are connected to the driving electrodes and the other ends of the touch driving lines are connected to at least one pad part, and one ends of the touch detection lines are connected to the detection electrodes and the other ends of the touch detection lines are connected to the at least one pad part.

In an embodiment, at least one of the touch driving lines and the touch detection lines extends from the at least one pad part in a first direction, is bent and extends in a second direction crossing the first direction, and is then bent and extends in the first direction, and at least one of the other of the touch driving lines and the touch detection lines extends from the at least one pad part in the first direction, is bent and extends in the second direction, and is then bent and extends in the first direction.

In an embodiment, the touch driving lines are disposed between two touch detection lines disposed adjacent to each other with the touch driving lines disposed therebetween. In an embodiment, the at least one pad part includes a plurality of pad electrodes formed on a substrate, the touch driving lines are connected to driving pads among the plurality of pad electrodes through a contact hole formed in the first touch insulating layer, respectively, the touch detection lines are connected to detection pads among the plurality of pad electrodes through a contact hole formed in the first touch insulating layer, respectively, and the at least one guard line is connected to at least one guard pad among the plurality of pad electrodes through a contact hole formed in the first touch insulating layer.

In an embodiment, the touch detection device further comprising a fourth touch insulating layer formed on the third touch insulating layer on which the driving electrode and the detection electrode are disposed, and a black matrix disposed on the fourth touch insulating layer, wherein the black matrix is formed in the mesh structure in a plan view and overlaps partial areas of the touch driving lines, the touch detection lines, the at least one guard line, the driving electrode, the detection electrode, and the connection electrode.

In an embodiment, a thickness of at least one of the second touch insulating layer and the third touch insulating layer is greater than each thickness of the first touch insulating layer and the fourth touch insulating layer.

In an embodiment, at least one of the second touch insulating layer and the third touch insulating layer is formed as an inorganic film including at least one of a silicon nitride layer, a silicon oxynitride layer, a silicon oxide layer, a titanium oxide layer, and an aluminum oxide layer.

According to an embodiment of the disclosure, a display device comprising a display panel including a display area having pixels displaying an image, a touch detector overlapping the display area and including a touch detection area having touch electrodes. and a touch driving circuit electrically connected to the touch electrodes, wherein the touch detector includes touch driving lines, driving electrodes, and detection electrodes disposed in the touch detection area, and any one of the touch driving lines overlaps at least one of the driving electrodes and at least one of the detection electrodes in the touch detection area, and is connected to a driving electrode different from the at least one of the driving electrodes.

According to an embodiment of the disclosure, a method for manufacturing a touch detection device, comprising forming touch driving lines and touch detection lines on a first touch insulating layer in a touch detection area, forming a second touch insulating layer on the touch driving lines and the touch detection lines, forming connection electrodes on the second touch insulating layer, forming a third touch insulating layer on the connection electrodes and the second touch insulating layer, and forming a driving electrode and a detection electrode on the third touch insulating layer, the driving electrode being connected to any one of the touch driving lines through a first contact hole formed in the second touch insulating layer and the third touch insulating layer, and the detection electrode being connected to any one of the touch detection lines through a second contact hole formed in the second touch insulating layer and the third touch insulating layer.

In an embodiment, the forming of the driving electrode and the detection electrode includes forming the first contact holes formed through the second touch insulating layer and the third touch insulating layer, and exposing the touch driving lines, forming the second contact holes formed through the second touch insulating layer and the third touch insulating layer, and exposing the touch detection lines, and forming touch contact holes formed through the third touch insulating layer and exposing the connection electrodes; and forming the driving electrode and the detection electrode, one of the driving electrode and the detection electrode being connected to the connection electrode through the touch contact hole.

In an embodiment, the forming of the touch driving lines and the touch detection lines includes forming at least one guard line between a touch driving line and a touch detection line disposed adjacent to each other among the touch driving lines and the touch detection lines.

In an embodiment, the forming of the touch driving lines and the touch detection lines further includes forming a first conductive metal layer on the first touch insulating layer, coating a photoresist layer on the first conductive metal layer, forming a photoresist pattern having a mesh structure using a mask for forming a photoresist pattern having the mesh structure, and patterning the touch driving lines, the touch detection lines, and at least one guide line by etching the first conductive metal layer using the photoresist pattern as a mask, the touch driving lines, the touch detection lines, and at least one guide line having the mesh structure that does not overlap light emitting parts formed in a display area.

In an embodiment, the forming of the driving electrode and the detection electrode includes forming a second conductive metal layer on the third touch insulating layer, coating a photoresist layer on the second conductive metal layer, forming a photoresist pattern having a mesh structure using a mask for forming a photoresist pattern having the mesh structure, and patterning the driving electrode and the detection electrode by etching the second conductive metal layer using the photoresist pattern as a mask, the driving electrode and the detection electrode having the mesh structure that does not overlap light emitting parts formed in a display area.

In an embodiment, the method further comprising forming a fourth touch insulating layer on the driving electrode and the detection electrode, forming a black matrix on the fourth touch insulating layer, and forming a color filter layer on the fourth touch insulating layer, wherein the forming of the black matrix includes forming the black matrix in the mesh structure in a plan view so that partial areas of the black matrix overlap the driving electrode, the detection electrode, and the connection electrode.

With the touch detection device, the display device including the same, and the method for manufacturing the same according to an embodiment, it is possible to minimize an area of an outer area of a touch detection area or make the area of the outer area zero by disposing the touch driving lines and the touch detection lines so as to overlap the touch detection area. In addition, it is possible to decrease a size of a bezel without deteriorating luminous efficiency by disposing the touch driving electrode and the detection electrodes so as to overlap the touch driving lines and the detection lines.

The effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present inventive concept will now be described more fully hereinafter with reference to the accompanying drawings, in which preferred embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present inventive concept. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Figure 1:
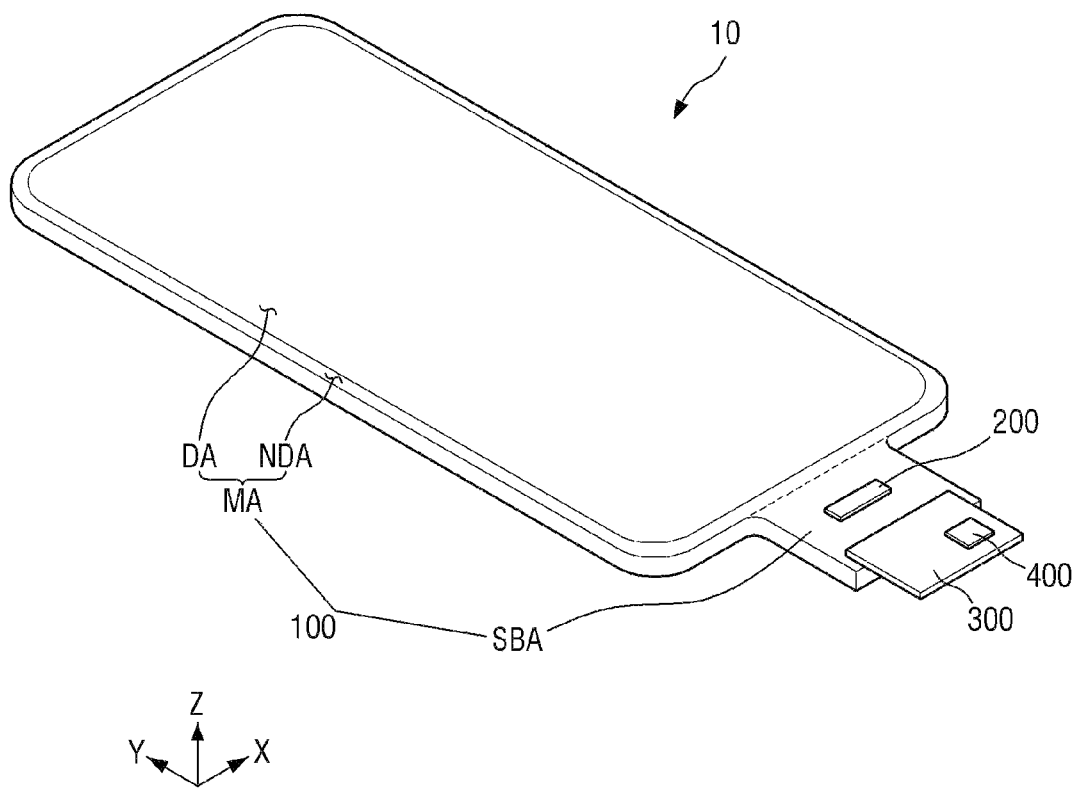
FIG. 1 is a perspective view illustrating a display device according to an embodiment.
Figure 2:
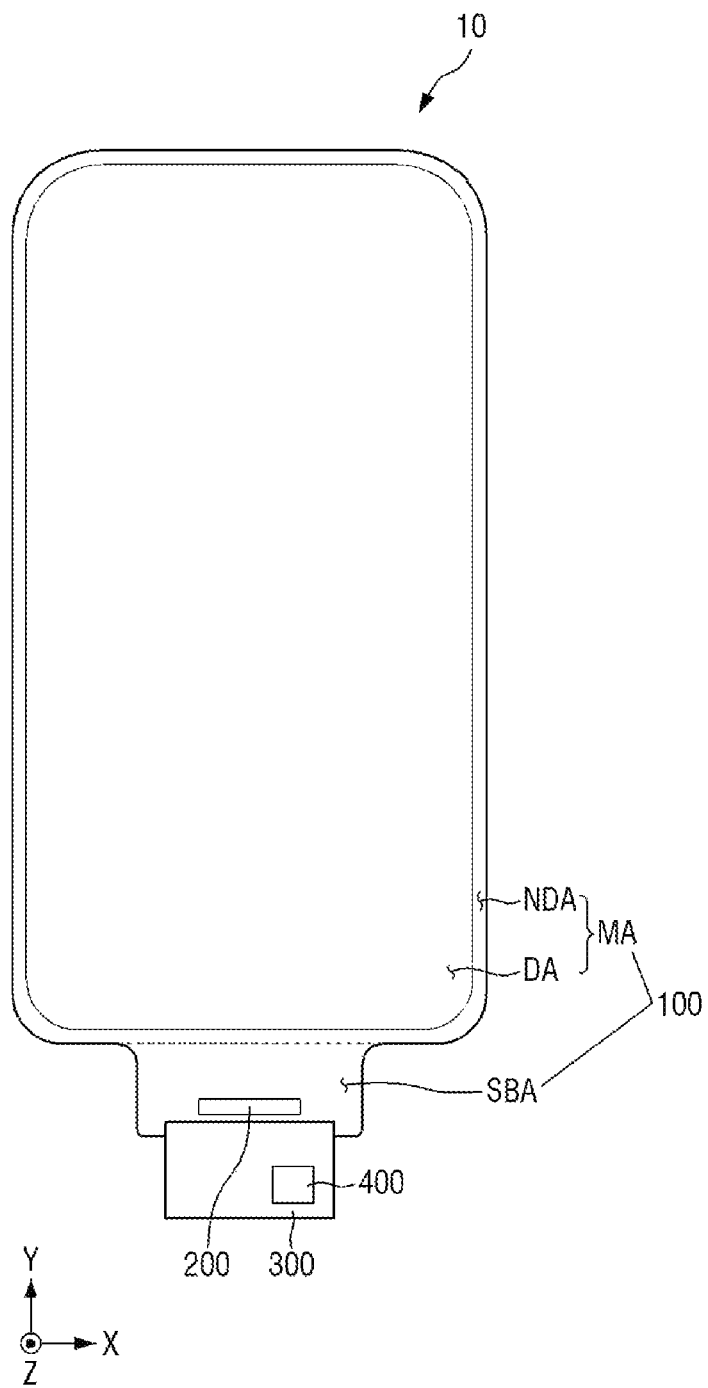
FIG. 2 is a plan view illustrating the display device according to an embodiment.
Figure 3:
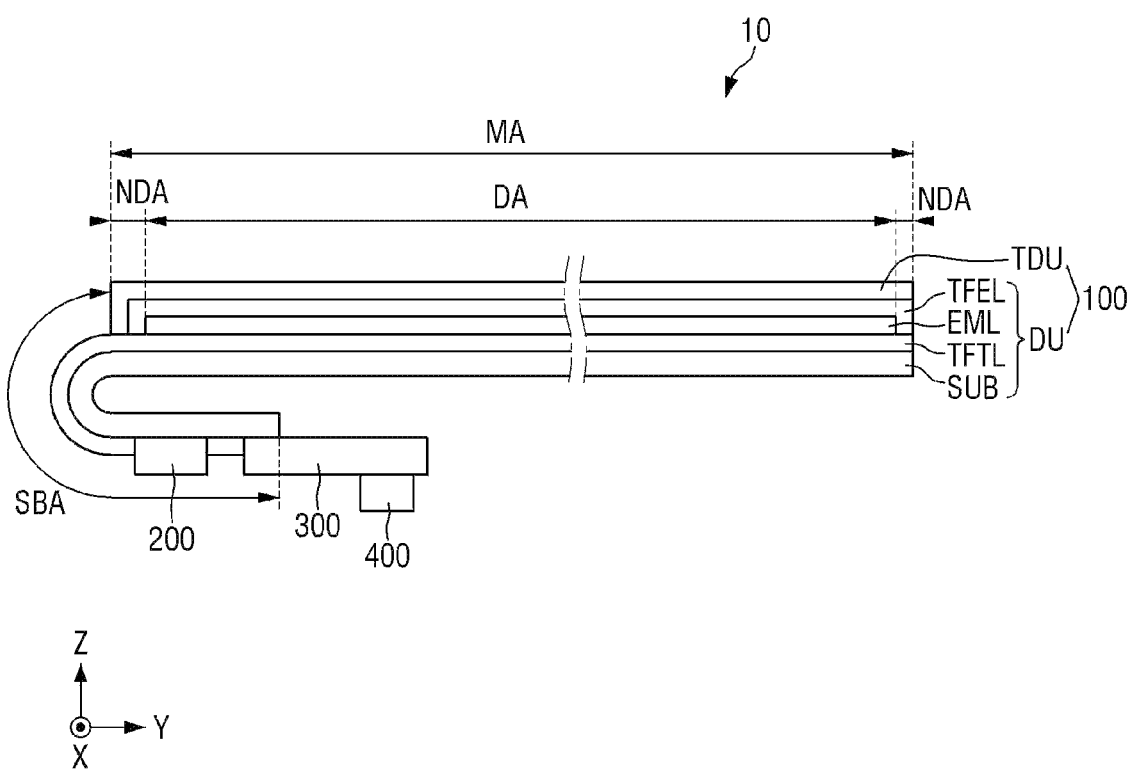
FIG. 3 is a side view illustrating the display device according to an embodiment.

FIG. 1 is a perspective view illustrating a display device according to an embodiment. FIG. 2 is a plan view illustrating the display device according to an embodiment. FIG. 3 is a side view illustrating the display device according to an embodiment.

Referring to FIGS. 1 to 3, a display device 10 according to an embodiment may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to an embodiment may be applied as a display unit of televisions, laptop computers, monitors, billboards, or the Internet of Things (IOTs). Alternatively, the display device 10 according to an embodiment may be applied to wearable devices such as smart watches, watch phones, glasses-type displays, and head mounted displays (HMDs). Alternatively, the display device 10 according to an embodiment may be applied to a center information display (CID) disposed on an instrument board, a center fascia, or a dashboard of a vehicle, a room mirror display substituting for a side mirror of the vehicle, or a display disposed on a rear surface of a front seat as entertainment for a rear seat of the vehicle.

The display device 10 according to an embodiment may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro or nano light emitting diode (micro LED or nano LED). Hereinafter, it has been mainly described that the display device 10 according to an embodiment is the organic light emitting display device, but the present disclosure is not limited thereto.

The display device 10 according to an embodiment includes a display panel 100, a display driving circuit 200, a display circuit board 300, and a touch driving circuit 400.

The display panel 100 may be formed in a rectangular shape in a plan view and having short sides in a first direction (X-axis direction) and long sides in a second direction (Y-axis direction) crossing the first direction (X-axis direction). A corner where the short side extending in the first direction (X-axis direction) and the long side extending in the second direction (Y-axis direction) meet may be rounded with a predetermined curvature or right-angled. The shape of the display panel 100 in a plan view is not limited to the rectangular shape, and may be a polygonal shape, a circular shape, or an elliptical shape. The display panel 100 may be formed to be flat, but the shape of the display panel 100 is not limited thereto. For example, the display panel 100 includes curved surface parts formed at left and right distal ends thereof and having a constant curvature or a variable curvature. In addition, the display panel 100 may be flexibly formed to be bent, folded, or rolled.

The display panel 100 includes a main area MA and a sub-area SBA. The main area MA includes a display area DA displaying an image and a non-display area NDA which is a peripheral area of the display area DA. The display area DA includes pixels displaying an image. The sub-area SBA may protrude from one side of the main area MA in the second direction (Y-axis direction).

It has been illustrated in FIGS. 1 and 2 that the sub-area SBA is unbent, but the sub-area SBA may be bent as illustrated in FIG. 3, and in this case, a portion of the sub-area SBA may be disposed on a rear surface of the display panel 100. When the sub-area SBA is bent, the sub-area SBA may overlap the main area MA in a third direction (Z-axis direction), which is a thickness direction of a substrate SUB. The display driving circuit 200 may be disposed in the sub-area SBA.

In addition, the display panel 100 may include a thin film transistor layer TFTL, a light emitting element layer EML, an encapsulation layer TFEL, and a touch detector TDU, as illustrated in FIG. 3.

The thin film transistor layer TFTL may be disposed on the substrate SUB. The thin film transistor layer TFTL may be disposed in the main area MA. The thin film transistor layer TFTL includes thin film transistors.

The light emitting element layer EML may be disposed on the thin film transistor layer TFTL. The light emitting element layer EML may be disposed in the display area DA of the main area MA. The light emitting element layer EML includes light emitting elements disposed in light emitting parts.

The encapsulation layer TFEL may be disposed on the light emitting element layer EML. The encapsulation layer TFEL may be disposed in the display area DA and the non-display area NDA of the main area MA. The encapsulation layer TFEL includes at least one inorganic layer and at least one organic layer for encapsulating the light emitting element layer.

The touch detector TDU may be formed or disposed on the encapsulation layer TFEL. The touch detector TDU may be formed or disposed on an entire surface of the main area MA, that is, in the display area DA and the non-display area NDA. The touch detector TDU may detect a touch by a user or an object using touch electrodes.

A cover window (not shown) for protecting an upper portion of the display panel 100 may be disposed on the touch detector TDU. The cover window may be attached onto the touch detector TDU by a transparent adhesive member such as an optically clear adhesive (OCA) layer or an optically clear resin (OCR). The cover window may be made of an inorganic material such as glass or be made of an organic material such as plastic or a polymer material. In order to prevent deterioration of visibility of an image due to reflection of external light, a polarizing layer (not shown) may be additionally disposed between the touch detector TDU and the cover window.

The display driving circuit 200 may generate signals and voltages for driving the display panel 100. The display driving circuit 200 may be formed as an integrated circuit (IC) and be attached onto the display panel 100 in a chip on glass (COG) configuration, a chip on plastic (COP) configuration, or an ultrasonic bonding configuration, but the configuration of the display driving circuit 200 is not limited thereto. For example, the display driving circuit 200 may be attached onto the display circuit board 300 in a chip on film (COF) configuration.

The display circuit board 300 may be attached to one end of the sub-area SBA of the display panel 100. Therefore, the display circuit board 300 may be electrically connected to the display panel 100 and the display driving circuit 200. The display panel 100 and the display driving circuit 200 may receive digital video data, timing signals, and driving voltages through the display circuit board 300. The display circuit board 300 may be a flexible film such as a flexible printed circuit board, a printed circuit board, or a chip on film.

The touch driving circuit 400 may be disposed on the display circuit board 300. The touch driving circuit 400 may be formed as an integrated circuit (IC) and mounted on the display circuit board 300.

The touch driving circuit 400 may be electrically connected to touch electrodes of the touch detector TDU. The touch driving circuit 400 applies touch driving signals to the touch electrodes of the touch detector TDU and measures a charge change amount in mutual capacitance of each of a plurality of touch nodes formed by the touch electrodes. The touch driving circuit 400 may determine whether or not a user has touched the display device, whether or not the user has approached the display device, and the like, according to the charge change amount of the mutual capacitance of each of the plurality of touch nodes. The touch of the user indicates that a user's finger or an object such as a pen comes into direct contact with one surface of the cover window disposed on the touch detector TDU. The approach of the user indicates that the user's finger or the object such as the pen hovers above one surface of the cover window.

As illustrated in FIGS. 1 to 3, in order to decrease reflection of external light by metal lines and metal electrodes of the display panel 100, the display panel 100 includes a color filter layer CFL (not shown) including color filters. Accordingly, a separate anti-reflection layer such as a polarizing plate does not need to be attached onto the display panel 100, and thus, a manufacturing cost of the display device 10 may be reduced. In addition, light emission luminance and luminous efficiency may be increased by applying the color filter layer CFL without using the polarizing plate.

Figure 4:
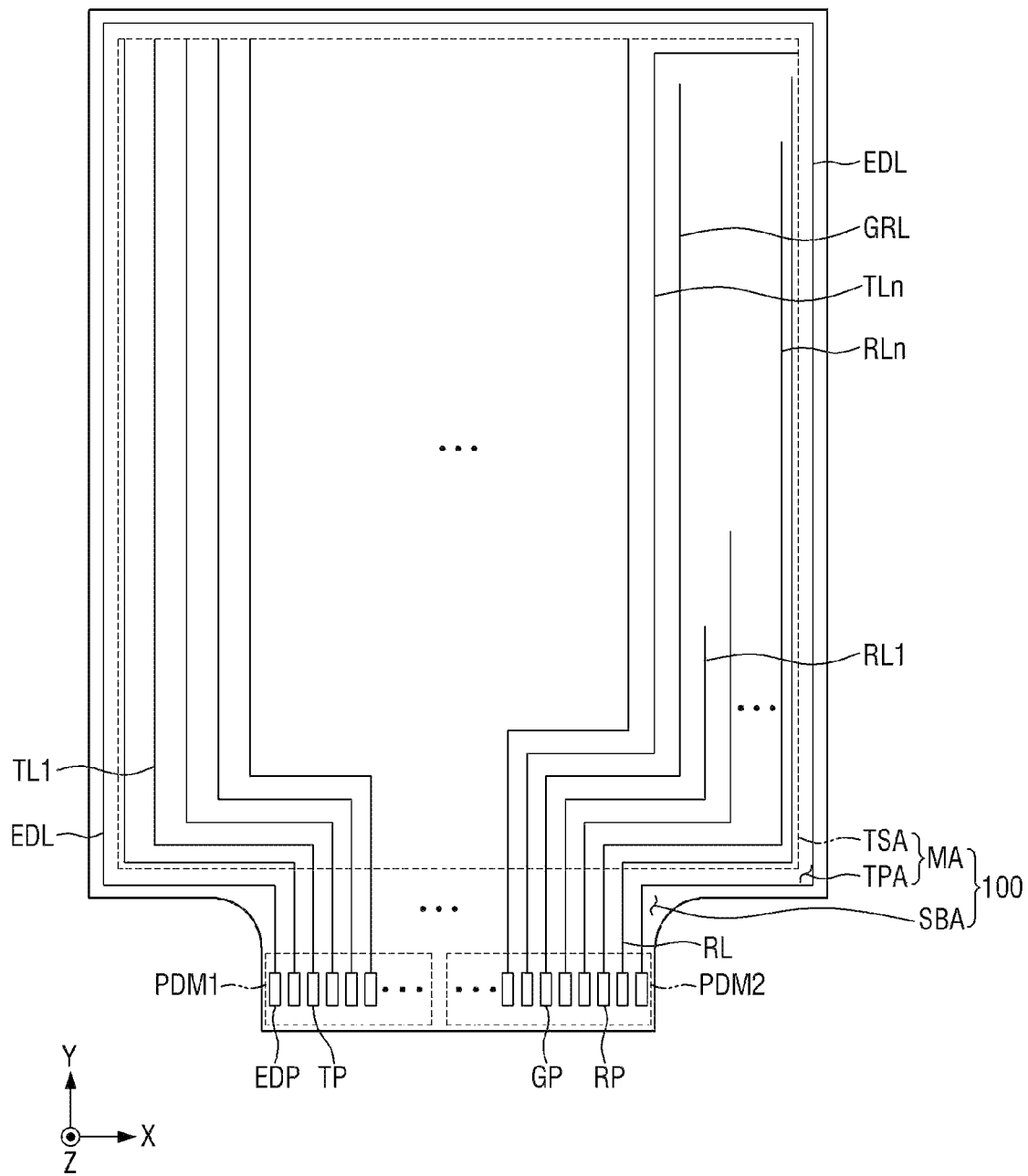
FIG. 4 is a schematic layout diagram illustrating signal lines disposed in a touch detector of FIG. 3.

FIG. 4 is a schematic layout diagram illustrating lines disposed in a touch detector of FIG. 3. In addition, FIG. 5 is a schematic layout diagram illustrating the touch detector disposed on signal lines of FIG. 4.

Figure 5:
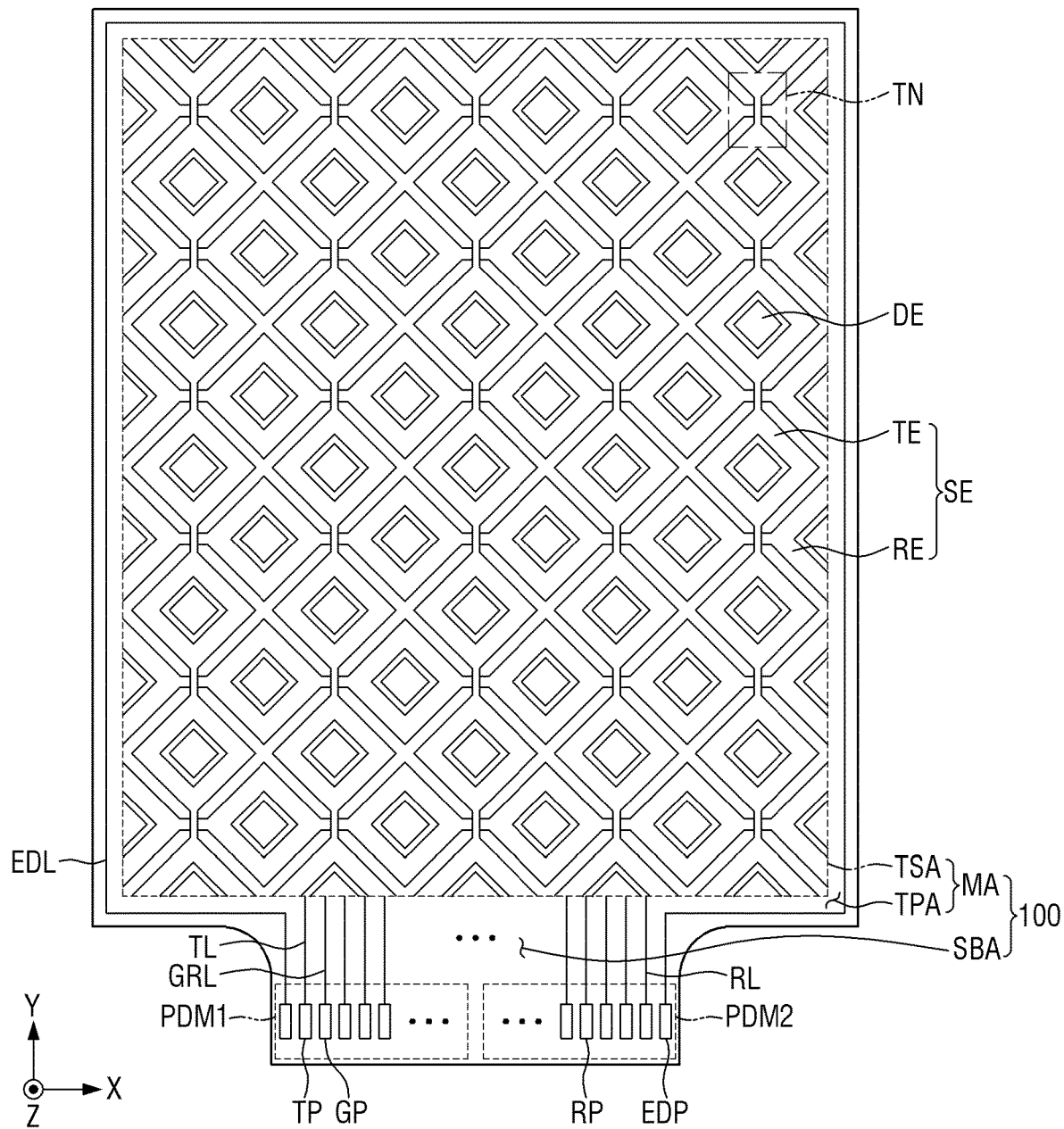
FIG. 5 is a schematic layout diagram illustrating the touch detector disposed on signal lines of FIG. 4.

Referring to FIGS. 4 and 5, the touch detector TDU includes a touch detection area TSA for detecting a touch of the user and a touch peripheral area TPA disposed around the touch detection area TSA. The touch detection area TSA may overlap the display area DA of FIGS. 1 to 3, and the touch peripheral area TPA may overlap the non-display area NDA of FIGS. 1 to 3.

Touch driving lines TL1 to TLn applying touch driving signals to driving electrodes TE, touch detection lines RL1 to RLn transmitting charge voltages through detection electrodes RE, and at least one guard line GRL to which a ground voltage is applied are disposed in the touch detection area TSA overlapping the display area DA.

The touch driving lines TL1 to TLn are electrically connected to the driving electrodes TE disposed on a front surface of the touch detection area TSA in the third direction (Z-axis direction), and the touch detection lines RL1 to RLn are connected to the detection electrodes RE arranged at the same layer as the driving electrodes TE. At least one guard line GRL is disposed between at least one touch driving line and the touch detection line.

The touch driving lines TL1 to TLn, the touch detection lines RL1 to RLn, and at least one guard line GRL are disposed and arranged at intervals greater than a preset minimum reference interval. In addition, the touch driving lines TL1 to TLn, the touch detection lines RL1 to RLn, and at least one guard line GRL may be arranged side by side in the first direction (X-axis direction) in the touch detection area TSA.

The touch driving lines TL1 to TLn, the touch detection lines RL1 to RLn, and at least one guard line GRL may have a shape in which one end or the other end thereof are bent at least once in the first direction (X-axis direction) and the second direction (Y-axis direction). The touch driving lines TL1 to TLn, the touch detection lines RL1 to RLn, and at least one guard line GRL may have a '┐' shape, a '∟' shape, or a combination shape of a '┐' shape and a '⌐' shape.

Each of the touch driving lines TL1 to TLn is connected to at least one driving electrode TE through at least one contact hole or the like, and one distal ends or the other distal ends of the touch driving lines TL1 to TLn are electrically connected to at least one pad part PDM1 and PDM2 formed in the sub-area SBA.

Each of the touch detection lines RL1 to RLn is connected to at least one detection electrode RE through at least one contact hole or the like, and one distal ends or the other distal ends of the touch detection lines RL1 to RLn are electrically connected to at least one pad part PDM1 and PDM2 formed in the sub-area SBA.

When any one touch driving line TL and any one touch detection line RL should be arranged adjacent to each other, at least one guard line GRL is disposed between the touch driving line TL and the touch detection line RL arranged adjacent to each other. At least one guard line GRL is connected to at least one pad part PDM1 and PDM2 to receive a ground voltage or a low potential voltage having a preset level. Accordingly, at least one guard line GRL may minimize that the touch detection line RL is affected by a change in a voltage level of the touch driving line TL.

An electrostatic discharge line EDL to which a ground voltage is applied is disposed in the touch peripheral area TPA so as to surround the entirety of an outer peripheral side of the touch detection area TSA. One distal end and the other distal end of the electrostatic discharge line EDL are electrically connected to at least one pad part PDM1 and PDM2. The electrostatic discharge line EDL receives a ground voltage or a low potential voltage having a preset level through at least one pad part PDM1 and PDM2.

As illustrated in FIG. 5, the driving electrodes TE, the detection electrodes RE, and dummy patterns DE are disposed on a front surface of the touch detection area TSA over the signal lines such as the touch driving lines TL1 to TLn, the touch detection lines RL1 to RLn, and at least one guard line GRL to overlap the touch driving lines TL1 to TLn, the touch detection lines RL1 to RLn, and at least one guard line GRL. The driving electrodes TE and the detection electrodes RE may be electrodes for forming mutual capacitance in order to detect a touch of an object or a person.

The detection electrodes RE may be arranged side by side in the first direction (X-axis direction) and the second direction (Y-axis direction). The detection electrodes RE may be electrically connected to each other only in the first direction (X-axis direction). In other words, the detection electrodes RE adjacent to each other in the first direction (X-axis direction) are electrically connected to each other and the detection electrodes RE adjacent to each other in the second direction (Y-axis direction) are electrically disconnected from each other.

The driving electrodes TE may be arranged side by side in the first direction (X-axis direction) and the second direction (Y-axis direction). The driving electrodes TE adjacent to each other in the second direction (Y-axis direction) are electrically connected to each other and the driving electrodes TE adjacent to each other in the first direction (X-axis direction) are electrically disconnected from each other.

Touch nodes TN in which mutual capacitance is formed are formed at intersection portions between the detection electrodes RE connected to each other in the first direction (X-axis direction) and the driving electrodes TE connected to each other in the second direction (Y-axis direction). A plurality of touch nodes TN may correspond to the intersection portions between the driving electrodes TE and the detection electrodes RE, respectively. The detection electrodes RE adjacent to each other in the first direction (X-axis direction) or the driving electrodes TE adjacent to each other in the second direction (Y-axis direction) may be connected to each other by connection electrodes BE to be described later with reference to FIG. 11 and the like.

Each of the dummy patterns DE may be disposed to be surrounded by the driving electrode TE or the detection electrode RE. Each of the dummy patterns DE may be disposed to be separated from the driving electrode TE or the detection electrode RE by a preset interval, such that each of the dummy patterns DE may be electrically floated.

It has been illustrated in FIG. 5 that each of the driving electrodes TE, the detection electrodes RE, and the dummy patterns DE has a rhombic shape in a plan view, but the present disclosure is not limited thereto. For example, each of the driving electrodes TE, the detection electrodes RE, and the dummy patterns DE may have a rectangular shape, a polygonal shape, a circular shape, or an elliptical shape in a plan view. Shape modification and application examples of the driving electrodes TE, the detection electrodes RE, and the dummy patterns DE in a plan view will be described in more detail later with reference to FIG. 10.

Referring to FIGS. 4 and 5, at least one of the detection electrodes RE connected to each other in the first direction (X-axis direction) may be connected to one touch detection line RL directly or through at least one contact hole or the like. The touch detection lines RL1 to RLn each connected to at least one of the detection electrodes RE may be connected to detection signal pads RP disposed at the at least one pad part PDM1 and PDM2 in a one-to-one manner. Therefore, the touch driving circuit 400 may be electrically connected to the detection electrodes RE.

At least one of driving electrodes TE of the driving electrodes TE connected to each other in the second direction (Y-axis direction) is connected to one touch driving line TL directly or through at least one contact hole or the like. The touch driving lines TL1 to TLn each connected to at least one of the driving electrodes TE may be connected to driving signal pads TP disposed at the at least one pad part PDM1 and PDM2 in a one-to-one manner. Therefore, the touch driving circuit 400 may be electrically connected to the driving electrodes TE.

At least one pad part, for example, one of the first and second pad parts PDM1 and PDM2, may include at least one guard pad GP to which the guard line GRL is connected, at least one ground pad EDP to which the electrostatic discharge line EDL is connected, the detection signal pads RP to which the touch detection lines RL are connected, and the driving signal pads TP to which the touch driving lines TL are connected.

Figure 6:
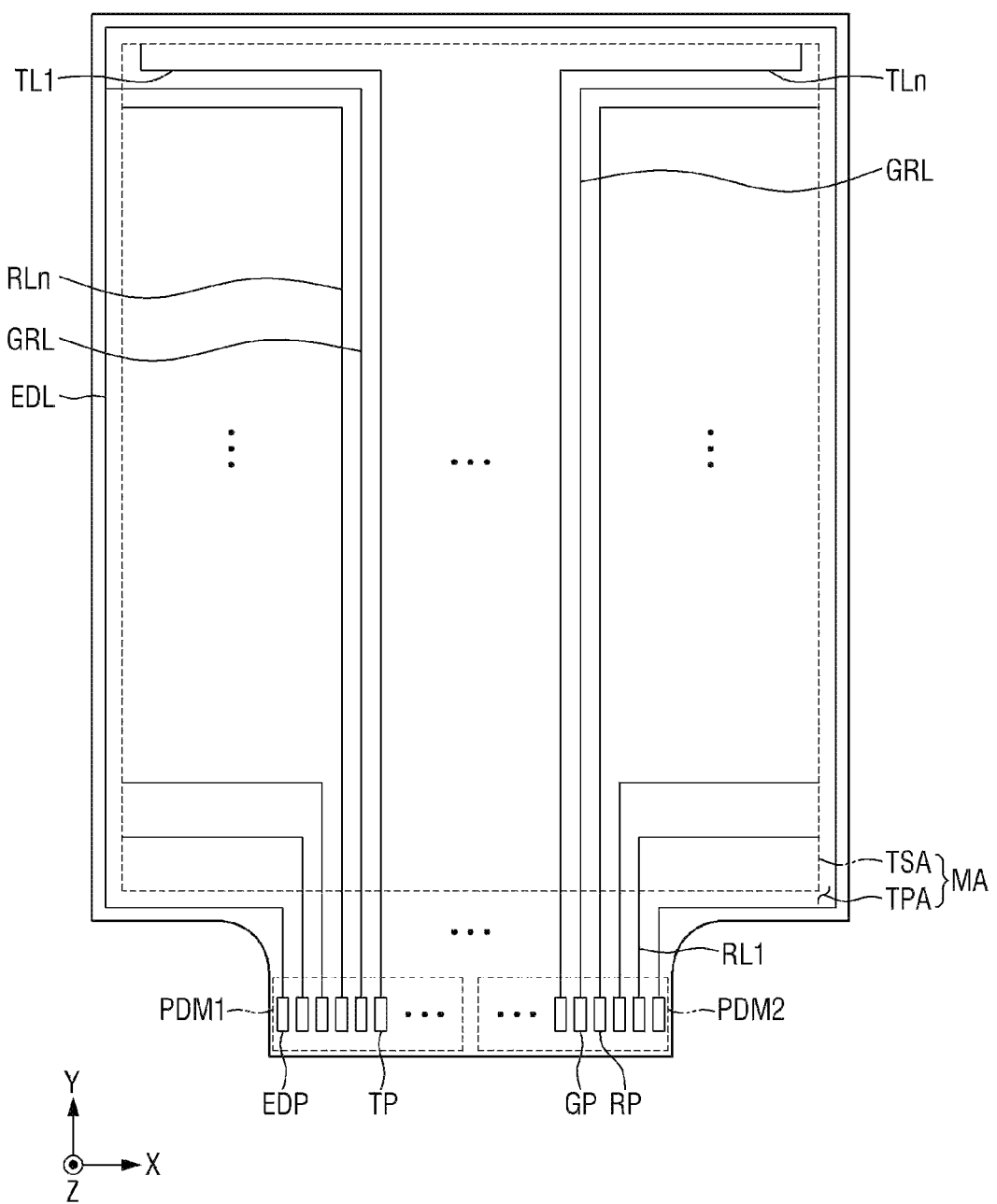
FIG. 6 is another schematic layout diagram illustrating signal lines disposed in a touch detector of FIG. 3.

FIG. 6 is another schematic layout diagram illustrating signal lines disposed in a touch detector of FIG. 3. In addition, FIG. 7 is another schematic layout diagram illustrating contact positions of the signal lines illustrated in FIGS. 4 and 6.

Figure 7:
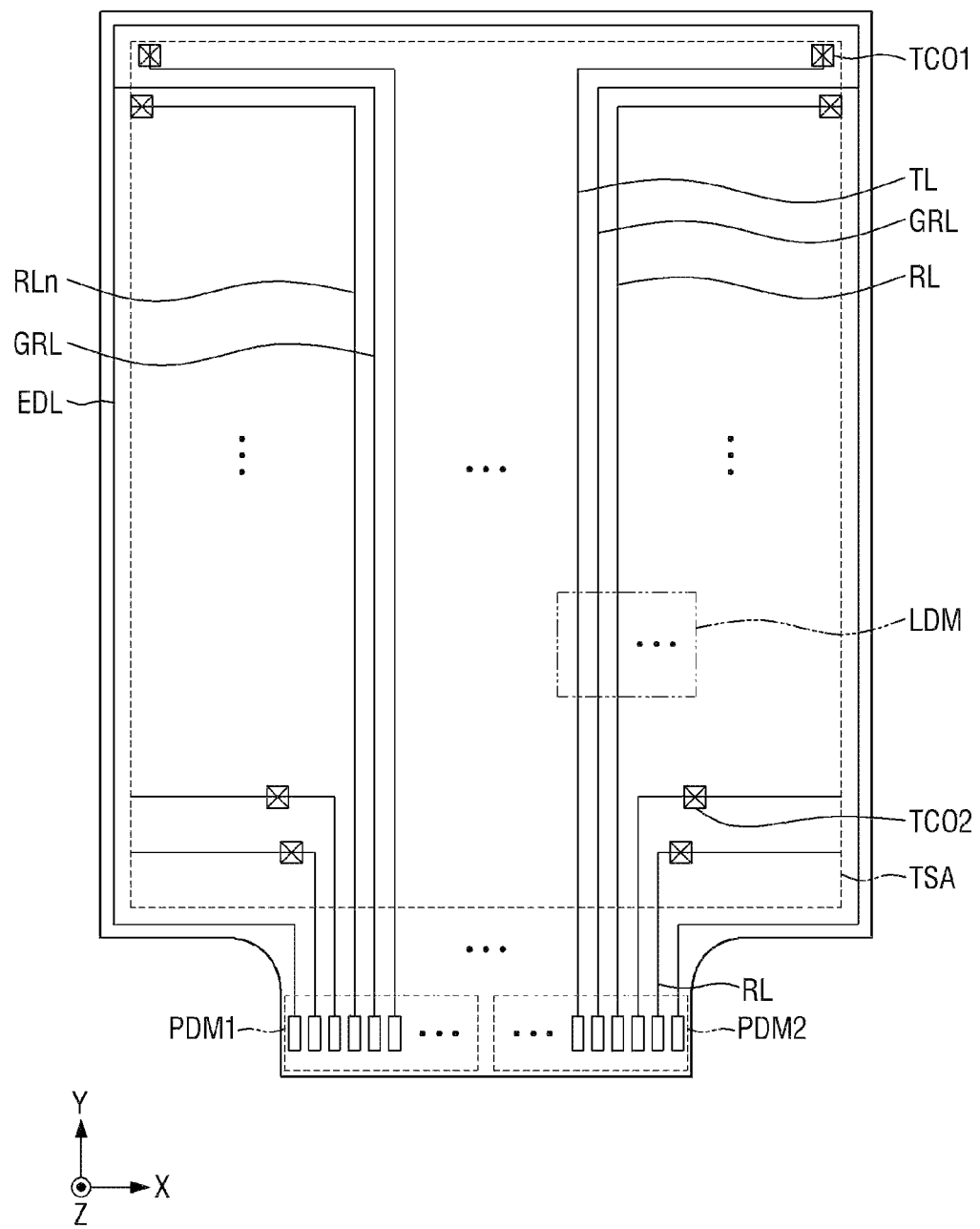
FIG. 7 is another schematic layout diagram illustrating contact positions of the lines illustrated in FIGS. 4 and 6.

Referring to FIGS. 6 and 7, at least one of detection electrodes RE disposed on the right side of the touch detection area TSA may be connected to respective touch detection line RL. To this end, touch detection lines disposed on the right side of the touch detection area TSA may be bent, formed, and disposed in an inverse '¬' shape (i.e., a 'Γ' shape) and be connected to the detection electrodes RE disposed on the right side of the touch detection area TSA.

At least one of the touch driving lines TL1 to TLn and the touch detection lines RL1 to RLn may extend from at least one pad part PDM1 and PDM2 in the second direction (Y-axis direction), be bent and extends in the first direction (X-axis direction) crossing the second direction (Y-axis direction), and then be bent and extends in the second direction (Y-axis direction). Here, at least the other of the touch driving lines TL1 to TLn and the touch detection lines RL1 to RLn may extend from a touch pad of each pad part PDM1 and PDM2 in the second direction (Y-axis direction), be bent and extends in the first direction (X-axis direction), and then be bent and extends in the second direction (Y-axis direction).

The touch driving lines TL1 to TLn may be disposed between two touch detection lines disposed adjacent to each other with the touch driving lines disposed therebetween. At least one of detection electrodes RE disposed on the left side of the touch detection area TSA may be connected to each touch detection line RL. To this end, touch detection lines disposed on the left side of the touch detection area TSA may be bent, formed, and disposed in an '¬' shape and be connected to the detection electrodes RE disposed on the left side of the touch detection area TSA.

The touch driving lines TL1 to TLn are disposed at preset intervals in an area between the touch detection lines disposed on the left side of the touch detection area TSA and the touch detection lines disposed on the left side of the touch detection area TSA. The touch driving lines TL1 to TLn may be formed and disposed in a combination shape of a '¬' shape and a 'L' shape so that they may be connected, respectively, to the driving electrodes TE connected to each other in the second direction (Y-axis direction). Meanwhile, at least one guard line GRL is disposed between any one touch driving line TL and any one touch detection line RL disposed adjacent to each other.

Any one distal end of each of the touch detection lines and the touch driving lines disposed on the left side of the touch detection area TSA may be electrically connected to the first pad part PDM1 formed in the sub-area SBA. In addition, any one distal end of each of the touch detection lines and the touch driving lines disposed on the right side of the touch detection area TSA may be electrically connected to the second pad part PDM2 formed in the sub-area SBA.

Referring to FIG. 7, at least one of the driving electrodes TE connected to each other in the second direction (Y-axis direction) is connected to each of the touch driving lines TL1 to TLn through at least one first contact hole TCO1. In addition, at least one of the detection electrodes RE connected to each other in the first direction (X-axis direction) is connected to each of the touch detection lines RL1 to RLn through at least one second contact hole TCO2.

The first contact holes TCO1 electrically connecting the respective driving electrodes TE and the respective touch driving lines TL1 to TLn to each other may be formed at at least one positions of one distal ends, the other distal ends, or the middle portions of the respective touch driving lines TL1 to TLn.

The second contact holes TCO2 electrically connecting the respective detection electrodes RE and the respective touch detection lines RL1 to RLn to each other may be formed at at least one positions of one distal ends, the other distal ends, or the middle portions of the respective touch detection lines RL1 to RLn.

Figure 8:
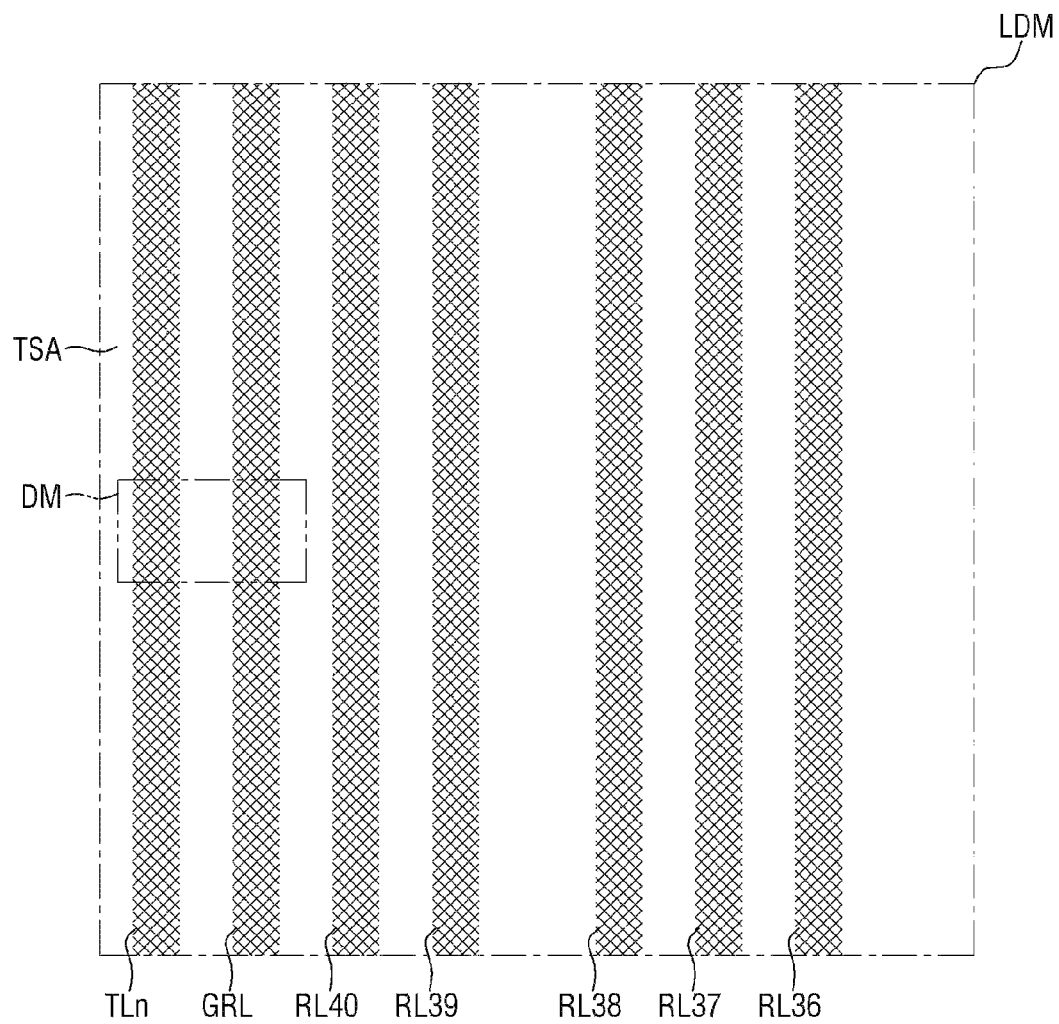
FIG. 8 is a layout diagram partially illustrating a structure, in a plan view, of the lines illustrated in FIGS. 4 and 6.

FIG. 8 is a layout diagram partially illustrating a structure of the signal lines in a plan view disclosed in FIGS. 4 and 6. In addition, FIG. 9 is a layout diagram illustrating a portion of an area in which a touch driving line and a guard line illustrated in FIG. 8 are formed, in detail.

Specifically, FIG. 8 is a plan view illustrating only a partial area LDM in which any one touch driving line TLn, one guard line GRL, and a predetermined number of touch detection lines RL36 to RL40 illustrated in FIG. 7 are formed. In addition, FIG. 9 is a plan view illustrating only a portion of an area DM in which the touch driving line TLn and the guard line GRL illustrated in FIG. 8 are formed.

Figure 9:
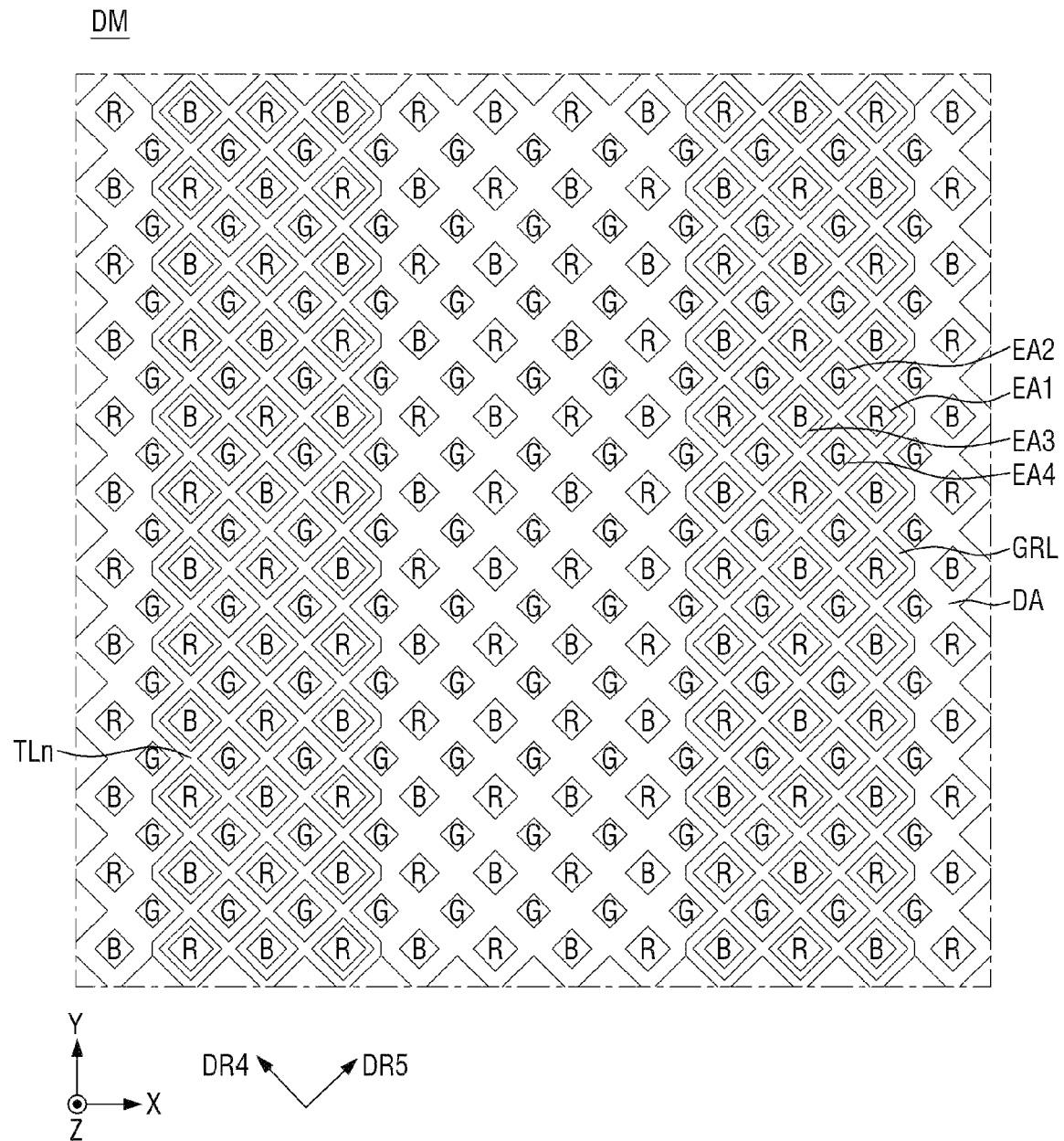
FIG. 9 is a layout diagram illustrating a portion of an area in which a touch driving line and a guard line illustrated in FIG. 8 are formed, in detail.

Referring to FIGS. 8 and 9, each of the touch driving lines TL1 to TLn, the touch detection lines RL1 to RLn, and at least one guard line GRL are formed in a mesh structure or a net structure in a plan view. Specifically, the touch driving lines TL1 to TLn, the touch detection lines RL1 to RLn, and at least one guard line GRL may be formed in a mesh structure that does not overlap light emitting parts EA1, EA2, EA3, and EA4 of each of pixels PX disposed in the display area DA. Therefore, it is possible to prevent light emitted from the light emitting parts EA1, EA2, EA3, and EA4 from being blocked by the touch driving lines TL1 to TLn, the touch detection lines RL1 to RLn, and at least one guard line GRL to prevent a decrease in luminance of the light.

Figure 10:
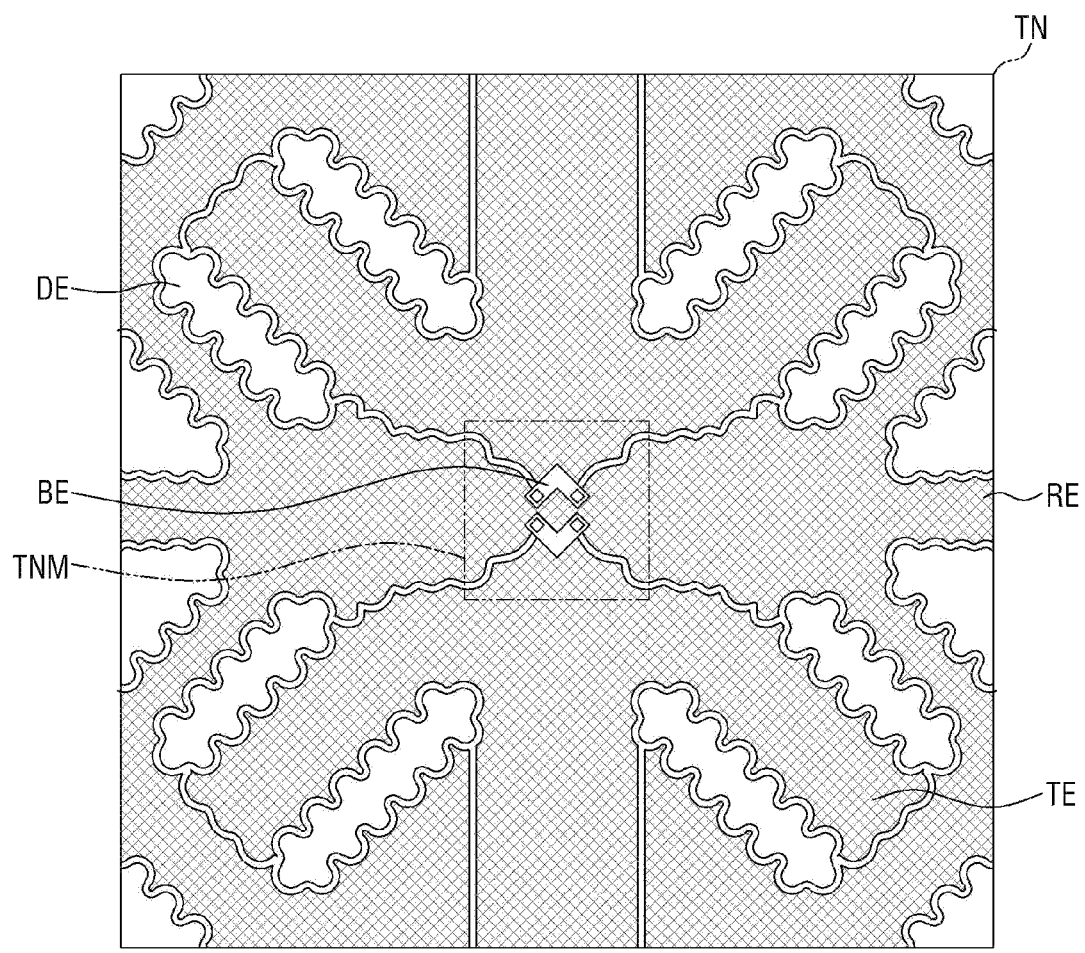
FIG. 10 is another schematic layout diagram illustrating a disposition structure of driving electrodes, detection electrodes, and dummy electrodes of the touch detector illustrated in FIG. 5.

FIG. 10 is another schematic layout diagram illustrating a disposition structure of driving electrodes, detection electrodes, and dummy electrodes of the touch detector illustrated in FIG. 5.

In FIG. 10, only the driving electrodes TE, the detection electrodes RE, and the dummy patterns DE are illustrated. As illustrated in FIG. 10, each of the driving electrodes TE, the detection electrodes RE, and the dummy patterns DE may be formed in various shapes in which a circular shape, a semicircular shape, and an elliptical shape are combined with each other in addition to a polygonal shape such as a rhombic shape.

The driving electrodes TE and the detection electrodes RE formed in a specific shape are disposed on the same layer to be spaced apart from each other. That is, a gap may be formed between the driving electrode TE and the detection electrode RE adjacent to each other. The dummy patterns DE are also disposed at the same layer as the driving electrodes TE and the detection electrodes RE, and thus, gaps may be formed between the driving electrode TE and the dummy pattern DE adjacent to each other and between the detection electrode RE and the dummy pattern DE adjacent to each other.

The connection electrodes BE may be disposed at a different layer from the driving electrodes TE and the detection electrodes RE. The connection electrode BE may be formed to be bent at least once. It has been illustrated in FIG. 10 that the connection electrode BE has a cramp shape ("∧" or "∨"), but a shape of the connection electrode BE in a plan view is not limited thereto. Since the detection electrodes RE adjacent to each other in the first direction (X-axis direction) are connected to each other by a plurality of connection electrodes BE, even though any one of the connection electrodes BE is disconnected, the detection electrodes RE adjacent to each other in the first direction (X-axis direction) may be stably connected to each other. It has been illustrated in FIG. 10 that the detection electrodes RE adjacent to each other are connected to each other by two connection electrodes BE, but the number of connection electrodes BE is not limited thereto.

Figure 11:
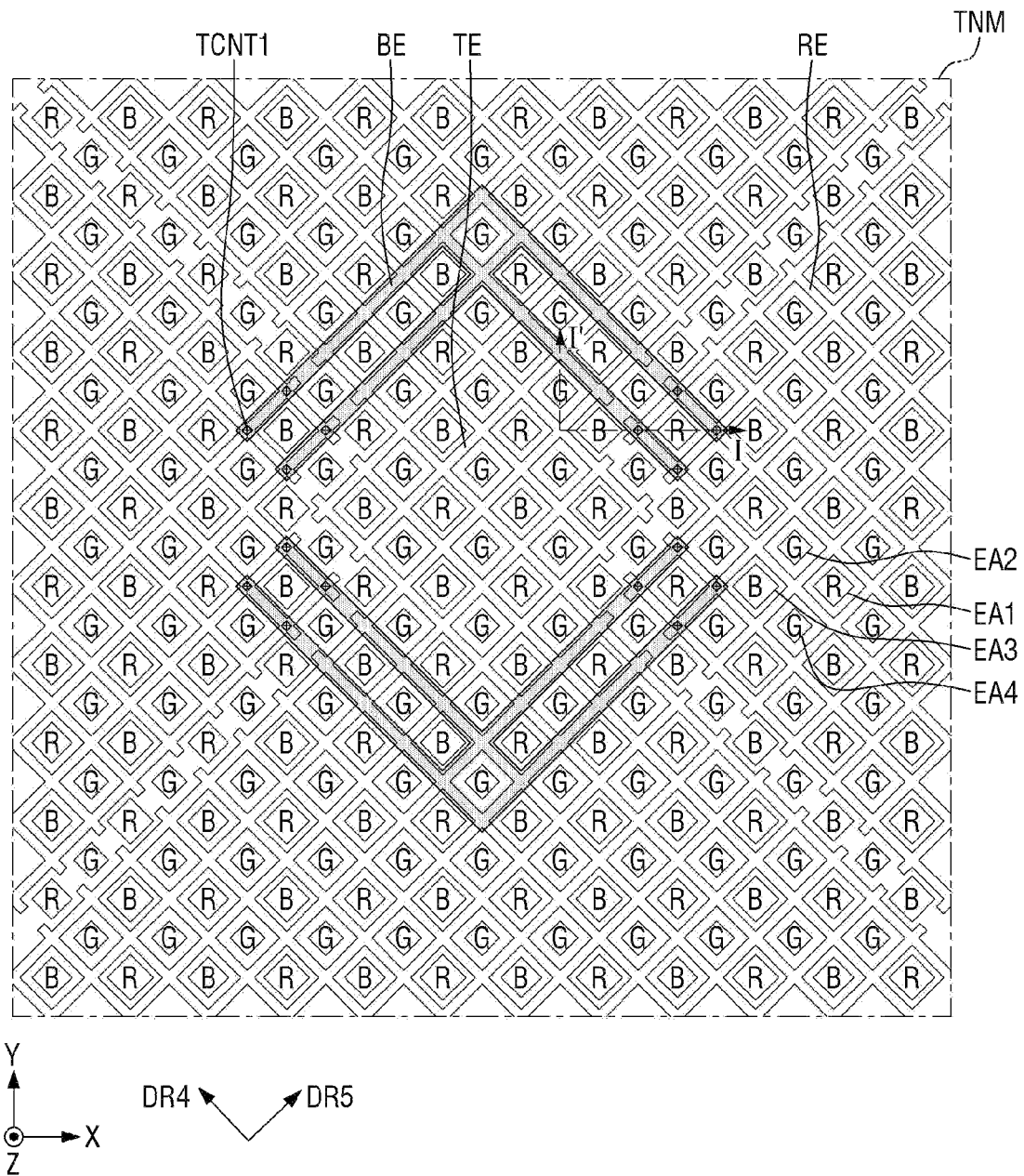
FIG. 11 is an enlarged plan view illustrating an example of a touch node of FIG. 10 in detail.

FIG. 11 is an enlarged plan view illustrating an example of a touch node of FIG. 10 in detail.

Referring to FIG. 11 together with FIG. 10, the connection electrode BE may overlap the detection electrodes RE adjacent to each other in the first direction (X-axis direction) in the third direction (Z-axis direction), which is the thickness direction of the substrate SUB. The connection electrode BE may overlap the driving electrode TE in the third direction (Z-axis direction). One side of the connection electrode BE may be connected to any one detection electrode RE of the detection electrodes RE adjacent to each other in the first direction (X-axis direction) through a touch contact hole TCNT1. The other side of the connection electrode BE may be connected to the other detection electrode RE of the detection electrodes RE adjacent to each other in the first direction (X-axis direction) through a touch contact hole TCNT1.

Due to the connection electrodes BE, the detection electrodes RE and the driving electrodes TE may be electrically disconnected from each other at the intersection portions between the detection electrodes RE and the driving electrodes TE. Therefore, mutual capacitance may be formed at the intersection portions where the driving electrodes TE and the detection electrodes RE intersect each other.

Similar to the touch driving lines TL1 to TLn, the touch detection lines RL1 to RLn, and at least one guard line GRL, each of the driving electrodes TE, the detection electrodes RE, and the connection electrodes BE may have a mesh structure or a net structure in a plan view. In addition, each of the dummy patterns DE may have a mesh structure or a net structure in a plan view.

A size and a shape of the mesh structure or the net structure of each of the driving electrodes TE, the detection electrodes RE, and the connection electrodes BE may be the same as a size and a form of the mesh structure or the net structure of each of the touch driving lines TL1 to TLn, the touch detection lines RL1 to RLn, and the guard line GRL.

The driving electrodes TE, the detection electrodes RE, and the connection electrodes BE may be disposed on front surfaces (i.e., the third direction (Z-axis direction) of the touch driving lines TL1 to TLn, the touch detection lines RL1 to RLn, and at least one guard line GRL so as to overlap the touch driving lines TL1 to TLn, the touch detection lines RL1 to RLn, and at least one guard line GRL in partial areas thereof with an inorganic insulating layer interposed therebetween. Therefore, similar to the touch driving lines TL1 to TLn, the touch detection lines RL1 to RLn, and at least one guard line GRL, each of the driving electrodes TE, the detection electrodes RE, the connection electrodes BE, and the dummy patterns DE may not overlap the light emitting parts EA1, EA2, EA3, and EA4 of each of the pixels PX. Therefore, it is possible to prevent the light emitted from the light emitting parts EA1, EA2, EA3, and EA4 from being blocked by the driving electrodes TE, the detection electrodes RE, the connection electrodes BE, and the dummy patterns DE to prevent a decrease in luminance of the light.

Each of the pixels PX includes a first light emitting part EA1 emitting light of a first color, a second light emitting part EA2 emitting light of a second color, a third light emission part EA3 emitting light of a third color, and a fourth light emitting part EA4 emitting light of the second color. For example, the first color may be red, the second color may be green, and the third color may be blue.

The first light emitting part EA1 and the second light emitting part EA2 of each of the pixels PX may neighbor to each other in a fourth direction DR4, and the third light emitting part EA3 and the fourth light emitting part EA4 of each of the pixels PX may neighbor to each other in the fourth direction DR4. The first light emitting part EA1 and the fourth light emitting part EA4 of each of the pixels PX may neighbor to each other in a fifth direction DR5, and the second light emitting part EA2 and the third light emitting part EA3 of each of the pixels PX may neighbor to each other in the fifth direction DR5.

Each of the first light emitting part EA1, the second light emitting part EA2, the third light emitting part EA3, and the fourth light emitting part EA4 may have a rhombic shape or a rectangular shape in a plan view, but the configuration of the light emitting parts is limited thereto. Each of the first light emitting part EA1, the second light emitting part EA2, the third light emitting part EA3, and the fourth light emitting part EA4 may have a polygonal shape, a circular shape, or an elliptical shape in a plan view. In addition, a structure in which an area of the first and third light emitting parts EA1 and EA3 is greater than that of the second and fourth light emitting parts EA2 and EA4 has been illustrated in FIG. 11, but the present disclosure is not limited thereto.

The second light emitting parts EA2 and the fourth light emitting parts EA4 may be disposed in odd-numbered columns. The second light emitting parts EA2 and the fourth light emitting parts EA4 may be disposed side by side in the second direction (Y-axis direction) in each of the odd-numbered columns. The second light emitting parts EA2 and the fourth light emitting parts EA4 may be alternately disposed in each of the odd-numbered columns. The first light emitting parts EA1 and the third light emitting parts EA3 may be disposed in even-numbered columns. The first light emitting parts EA1 and the third light emitting parts EA3 may be disposed side by side in the second direction (Y-axis direction) in each of the even-numbered columns. The first light emitting parts EA1 and the third light emitting parts EA3 may be alternately disposed in even-numbered columns or rows.

The second light emitting parts EA2 and the fourth light emitting parts EA4 may also be disposed in even-numbered rows. The second light emitting parts EA2 and the fourth light emitting parts EA4 may be disposed side by side in the first direction (X-axis direction) in each of the even-numbered rows. The second light emitting parts EA2 and the fourth light emitting parts EA4 may be alternately disposed in each of the even-numbered rows.

The first light emitting parts EA1 and the third light emitting parts EA3 may be disposed in odd-numbered rows. The first light emitting parts EA1 and the third light emitting parts EA3 may be disposed side by side in the first direction (X-axis direction) in each of the odd-numbered rows. The first light emitting parts EA1 and the third light emitting parts EA3 may be alternately disposed in the odd-numbered rows.

Figure 12:
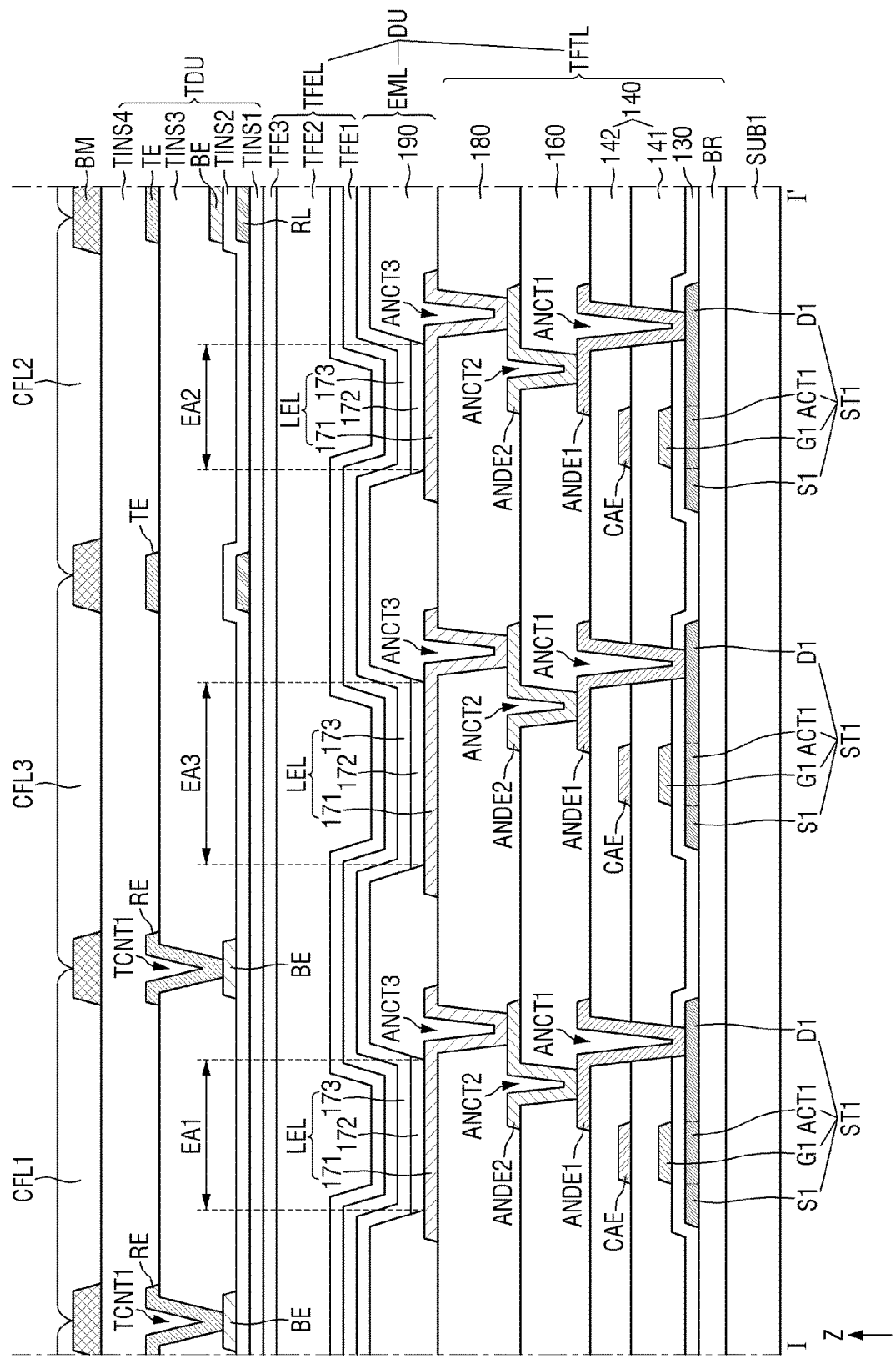
FIG. 12 is a cross-sectional view illustrating an example of a display panel taken along line I-I' of FIG. 11.

FIG. 12 is a cross-sectional view illustrating an example of a display panel taken along line I-I' of FIG. 11.

Referring to FIG. 12, a barrier layer BR may be disposed on a substrate SUB. The substrate SUB may be made of an insulating material such as a polymer resin. For example, the substrate SUB may be made of polyimide. The substrate SUB may be a flexible substrate that may be bent, folded, and rolled.

The barrier layer BR is a layer for protecting transistors of a thin film transistor layer TFTL and light emitting layers 172 of a light emitting element layer EML from moisture permeating through the substrate SUB which is vulnerable to moisture permeation. The barrier layer BR may include a plurality of inorganic layers that are alternately stacked. For example, the barrier layer BR may be formed as multiple layers in which one or more inorganic layers of a silicon nitride layer, a silicon oxynitride layer, a silicon oxide layer, a titanium oxide layer, and an aluminum oxide layer are alternately stacked.

Thin film transistors ST1 may be disposed on the barrier layer BR. Each thin film transistor ST1 includes an active layer ACT1, a gate electrode G1, a source electrode S1, and a drain electrode D1.

The active layer ACT1, the source electrode S1, and the drain electrode D1 of each of the thin film transistors ST1 may be disposed on the barrier layer BR. The active layer ACT1 of the thin film transistor ST1 includes polycrystalline silicon, single crystal silicon, low-temperature polycrystalline silicon, amorphous silicon, or an oxide semiconductor. The active layer ACT1 overlapping the gate electrode G1 in the third direction (Z-axis direction), which is the thickness direction of the substrate SUB, may be defined as a channel region. The source electrode S1 and the drain electrode D1 are regions that do not overlap the gate electrode G1 in the third direction (Z-axis direction), and may have conductivity by doping a silicon semiconductor or an oxide semiconductor with ions or impurities.

A gate insulating layer 130 may be disposed on the active layer ACT1, the source electrode S1, and the drain electrode D1 of each of the thin film transistors ST1. The gate insulating layer 130 may be formed as an inorganic layer, for example, a silicon nitride layer, a silicon oxynitride layer, a silicon oxide layer, a titanium oxide layer, or an aluminum oxide layer.

The gate electrode G1 of the thin film transistor ST1 may be disposed on the gate insulating layer 130. The gate electrode G1 may overlap the active layer ACT1 in the third direction (Z-axis direction). The gate electrode G1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first interlayer insulating layer 141 may be disposed on the gate electrode G1 of the thin film transistor ST1. The first interlayer insulating layer 141 may be formed as an inorganic layer, for example, a silicon nitride layer, a silicon oxynitride layer, a silicon oxide layer, a titanium oxide layer, or an aluminum oxide layer. The first interlayer insulating layer 141 may be formed as a plurality of inorganic layers.

A capacitor electrode CAE may be disposed on the first interlayer insulating layer 141. The capacitor electrode CAE may overlap the gate electrode G1 of the first thin film transistor ST1 in the third direction (Z-axis direction). Since the first interlayer insulating layer 141 has a predetermined dielectric constant, a capacitor may be formed by the capacitor electrode CAE, the gate electrode G1, and the first interlayer insulating layer 141 disposed between the capacitor electrode CAE and the gate electrode G1. The capacitor electrode CAE may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second interlayer insulating layer 142 may be disposed on the capacitor electrode CAE. The second interlayer insulating layer 142 may be formed as an inorganic layer, for example, a silicon nitride layer, a silicon oxynitride layer, a silicon oxide layer, a titanium oxide layer, or an aluminum oxide layer. The second interlayer insulating layer 142 may be formed as a plurality of inorganic layers.

A first anode connection electrode ANDE1 may be disposed on the second interlayer insulating layer 142. The first anode connection electrode ANDE1 may be connected to the drain electrode D1 of the thin film transistor ST1 through a first connection contact hole ANCT1 formed through the gate insulating layer 130, the first interlayer insulating layer 141, and the second interlayer insulating layer 142. The first anode connection electrode ANDE1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first planarization film 160 for planarizing a step due to the thin film transistor ST1 may be disposed on the first anode connection electrode ANDE1. The first planarization film 160 may be formed as an organic film made of an acryl resin, an epoxy resin, a phenolic resin, a polyamide resin, a polyimide resin, or the like.

A second anode connection electrode ANDE2 may be disposed on the first planarization film 160. The second anode connection electrode ANDE2 may be connected to the first anode connection electrode ANDE1 through a second connection contact hole ANCT2 formed through the first planarization film 160. The second anode connection electrode ANDE2 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second planarization film 180 may be disposed on the second anode connection electrode ANDE2. The second planarization film 180 may be formed as an organic film made of an acryl resin, an epoxy resin, a phenolic resin, a polyamide resin, a polyimide resin, or the like.

Light emitting elements LEL and a bank 190 may be disposed on the second planarization film 180. Each of the light emitting elements LEL includes a pixel electrode 171, a light emitting layer 172, and a common electrode 173.

The pixel electrode 171 may be disposed on the second planarization film 180. The pixel electrode 171 may be connected to the second anode connection electrode ANDE2 through a third connection contact hole ANCT3 formed through the second planarization film 180.

In a top emission structure in which light is emitted toward the common electrode 173 from the light emitting layer 172, the pixel electrode 171 may be formed of a metal material having high reflectivity, such as a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The bank 190 may be formed to partition the pixel electrodes 171 on the second planarization film 180, in order to define the first light emitting part EA1, the second light emitting part EA2, the third light emitting part EA3, and the fourth light emitting part EA4. The bank 190 may be disposed to cover an edge of the pixel electrode 171. The bank 190 may be formed as an organic layer made of an acryl resin, an epoxy resin, a phenolic resin, a polyamide resin, a polyimide resin, or the like.

Each of the first light emitting part EA1, the second light emitting part EA2, the third light emitting part EA3, and the fourth light emitting part EA4 refers to an area in which the pixel electrode 171, the light emitting layer 172, and the common electrode 173 are sequentially stacked and holes from the pixel electrode 171 and electrons from the common electrode 173 are combined with each other in the light emitting layer 172 to emit light.

The light emitting layer 172 may be disposed on the pixel electrode 171 and side surfaces of the bank 190. The light emitting layer 172 may include an organic material to emit light of a predetermined color. For example, the light emitting layer 172 includes a hole transporting layer, an organic material layer, and an electron transporting layer.

The common electrode 173 may be disposed on the light emitting layer 172. The common electrode 173 may be disposed to cover the light emitting layer 172. The common electrode 173 may be a common layer commonly formed in the first light emitting part EA1, the second light emitting part EA2, the third light emitting part EA3, and the fourth light emitting part EA4. A capping layer may be formed on the common electrode 173.

In the top emission structure, the common electrode 173 may be formed of a transparent conductive material (TCO) such as ITO or indium zinc oxide (IZO) capable of transmitting light therethrough or a semi-transmissive conductive material such as magnesium (Mg), silver (Ag), or an alloy of magnesium (Mg) and silver (Ag). When the common electrode 173 is formed of the semi-transmissive conductive material, emission efficiency may be increased by a micro cavity.

An encapsulation layer TFEL may be disposed on the common electrode 173. The encapsulation layer TFEL includes at least one inorganic layer in order to prevent oxygen or moisture from permeating into the light emitting element layer EML. In addition, the encapsulation layer TFEL includes at least one organic layer in order to protect the light emitting element layer EML from foreign materials such as dust. For example, the encapsulation layer TFEL includes a first encapsulation inorganic film TFE1, an encapsulation organic film TFE2, and a second encapsulation inorganic film TFE3.

The first encapsulation inorganic film TFE1 may be disposed on the common electrode 173, the encapsulation organic film TFE2 may be disposed on the first encapsulation inorganic film TFE1, and the second encapsulation inorganic film TFE3 may be disposed on the encapsulation organic film TFE2. The first encapsulation inorganic film TFE1 and the second encapsulation inorganic film TFE3 may be formed as multiple films in which one or more inorganic films of a silicon nitride layer, a silicon oxynitride layer, a silicon oxide layer, a titanium oxide layer, and an aluminum oxide layer are alternately stacked. The encapsulation organic film TFE2 may be an organic film made of an acryl resin, an epoxy resin, a phenolic resin, a polyamide resin, a polyimide resin, or the like.

A touch detector TDU may be disposed on the encapsulation layer TFEL. The touch detector TDU includes a first touch insulating layer TINS1, touch driving lines TL1 to TLn, touch detection lines RL1 to RLn, a guard line GRL, a second touch insulating layer TINS2, connection electrodes BE, a third touch insulating layer TINS3, driving electrode TE, detection electrodes RE, and a fourth touch insulating layer TINS4.

The first touch insulating layer TINS1 may be formed as an inorganic film, for example, a silicon nitride layer, a silicon oxynitride layer, a silicon oxide layer, a titanium oxide layer, or an aluminum oxide layer.

The touch driving lines TL1 to TLn, the touch detection lines RL1 to RLn, and at least one guard line GRL may be disposed on the first touch insulating layer TINS1. The touch driving lines TL1 to TLn, the touch detection lines RL1 to RLn, and at least one guard line GRL may be formed of any one of molybdenum (Mo), aluminum (Al), chromium (Cr), gold (Au), titanium (Ti), nickel (Ni), neodymium (Nd), and copper (Cu), or alloys thereof.

The second touch insulating layer TINS2 is disposed on the first touch insulating layer TINS1 so as to cover all of the touch driving lines TL1 to TLn, the touch detection lines RL1 to RLn, and at least one guard line GRL. The second touch insulating layer TINS2 may be formed as an inorganic film, for example, a silicon nitride layer, a silicon oxynitride layer, a silicon oxide layer, a titanium oxide layer, or an aluminum oxide layer, similar to the first touch insulating layer TINS1. Here, the second touch insulating layer TINS2 may be formed to be thicker than the first touch insulating layer TINS1.

The connection electrodes BE may be disposed on the second touch insulating layer TINS2. The connection electrode BE may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

The third touch insulating layer TINS3 is disposed on the connection electrodes BE. The third touch insulating layer TINS3 may be formed as an organic film made of an acryl resin, an epoxy resin, a phenolic resin, a polyamide resin, a polyimide resin, or the like. Alternatively, the third touch insulating layer TINS3 may be formed as an inorganic film, that is, a silicon nitride layer, a silicon oxynitride layer, a silicon oxide layer, a titanium oxide layer, or an aluminum oxide layer.

The driving electrodes TE, the detection electrodes RE, and the dummy patterns DE may be disposed on the third touch insulating layer TINS3. Each of the driving electrodes TE, the detection electrodes RE, and the dummy patterns DE may be formed of any one of molybdenum (Mo), aluminum (Al), chromium (Cr), gold (Au), titanium (Ti), nickel (Ni), neodymium (Nd), and copper (Cu), or alloys thereof. An example in which each of the driving electrodes TE, the detection electrodes RE, and the dummy pattern DE is formed as a single layer has been illustrated in FIG. 12, but each of the driving electrodes TE, the detection electrodes RE, and the dummy pattern DE may also be formed as multiple layers.

The driving electrode TE and the detection electrode RE may overlap the connection electrode BE in the third direction (Z-axis direction). The detection electrode RE may be connected to the connection electrode BE through a touch contact hole TCNT1 formed through the third touch insulating layer TINS3.

The fourth touch insulating layer TINS4 is formed on the driving electrodes TE and the detection electrodes RE. The fourth touch insulating layer TINS4 may serve to planarize a step formed due to the driving electrodes TE, the detection electrodes RE, and the connection electrodes BE. To this end, the fourth touch insulating layer TINS4 may be formed as an inorganic film, that is, a silicon nitride layer, a silicon oxynitride layer, a silicon oxide layer, a titanium oxide layer, or an aluminum oxide layer. Alternatively, the fourth touch insulating layer TINS4 may be formed as an organic film made of an acryl resin, an epoxy resin, a phenolic resin, a polyamide resin, a polyimide resin, or the like.

A black matrix BM and a color filter layer CFL may be formed on the touch detector TDU. The black matrix BM may have a mesh structure or a net structure in a plan view, similar to the driving electrodes TE, the detection electrodes RE, the touch driving lines TL1 to TLn, the touch detection lines RL1 to RLn, and at least one guard line GRL. That is, the touch driving lines TL1 to TLn, the touch detection lines RL1 to RLn, and at least one guard line GRL may be formed in a size and a shape of an open part of the mesh structure or the net structure of the black matrix BM so as to overlap the black matrix BM. Therefore, the black matrix BM may not overlap the light emitting parts EA1, EA2, EA3, and EA4 of each of the pixels PX, similar to the driving electrodes TE, the detection electrodes RE, the touch driving lines TL1 to TLn, the touch detection lines RL1 to RLn, and at least one guard line GRL. Therefore, it is possible to prevent the light emitted from the light emitting parts EA1, EA2, EA3, and EA4 from being blocked by the driving electrodes TE, the detection electrodes RE, the connection electrodes BE, and the black matrix BM to prevent a decrease in luminance of the light.

The color filter layer CFL may be formed by disposing a plurality of first to third color filters CFL1, CFL2, and CFL3 in a planar shape on the fourth touch insulating layer TINS4.

The first color filter CFL1 may be disposed on the first light emitting part EA1 emitting the light of the first color, the second color filter CFL2 may be disposed on the second light emitting part EA2 emitting the light of the second color, and the third color filter CFL3 may be disposed on the third light emitting part EA3 emitting the light of the third color. In addition, the second color filter CFL2 may be disposed on the fourth light emitting part EA4 emitting the light of the second color.

As an example, the first color may be red, the second color may be green, and the third color may be blue. Accordingly, the first color filter CFL1 may be a red color filter, the second color filter CFL2 may be a green color filter, and the third color filter CFL3 may be a blue color filter. As another example, the first and third light emitting parts EA1 and EA3 may emit green light which is light of a second color, the second light emitting part EA2 may emit red light which is light of a first color, and the fourth light emitting part EA4 may emit blue light which is light of a third color. Accordingly, the first color filter CFL1 may be a green color filter, the second color filter CFL2 may be a red color filter, and the third color filter CFL3 may be a blue color filter. As still another example, at least one of the first to fourth light emitting parts EA1 to EA4 may emit white light. Accordingly, a transparent or white color filter may be formed on at least one light emitting part emitting the white light.

The red color filter may selectively transmit red light of about 620 nm to 750 nm. In addition, the green color filter may selectively transmit green light of about 495 nm to 570 nm, and the blue color filter may selectively transmit blue light of about 450 nm to 495 nm.

The first to third color filters CFL1, CFL2, CFL3 of the same color, for example, the white color filter, and the like, may be disposed above the first to fourth light emitting parts EA1 to EA4 each emitting the light of the first to third colors to prevent color mixing between the first to fourth emitting parts EA1 to EA4 and increase color reproducibility. In addition, since the first to third color filters CFL1, CFL2, and CFL3 absorb external light at a significant level, reflection of the external light may be decreased without additionally disposing a polarizing plate.

The first to third color filters CFL1, CFL2, and CFL3 not only transmit the light from the first to fourth light emitting parts EA1 to EA4 but also decrease reflectivity of light incident from the outside. As the external light passes through the first to third color filters CFL1, CFL2, and CFL3, an amount of the light may be decreased up to about ⅓. Accordingly, the light passing through the first to third color filters CFL1, CFL2, and CFL3 may be partially extinguished, and be partially reflected from the first to fourth light emitting parts EA1 to EA4, the encapsulation layer TFEL, and the like, disposed under the first to third color filters CFL1, CFL2, and CFL3. The reflected light may be incident again on the first to third color filters CFL1, CFL2, and CFL3, and luminance of such reflected light decreases while such reflected light passes through the first to third color filters CFL1, CFL2, and CFL3, respectively. As a result, only a portion of the external light is reflected back to the outside, and thus, reflectivity of the external light may decrease.

Each of the first to third color filters CFL1, CFL2, and CFL3 may include an organic material. In an embodiment, each of the first to third color filters CFL1, CFL2, and CFL3 may have a refractive index higher than that of each of the first to third touch insulating layers TINS1 to TINS3. For example, when each of the first to third touch insulating layers TINS1 to TINS3 has a refractive index of about 1.53, each of the first to third color filters CFL1, CFL2, and CFL3 may have a refractive index of about 1.65. Since the first to third color filters CFL1, CFL2, and CFL3 are formed to have the refractive index higher than that of the first to third touch insulating layers TINS1 to TINS3, a light condensing effect of light progressing obliquely may be improved, and light trapped at an interface of the encapsulation layer TFEL may be extracted, such that a total amount of light may increase.

FIGS. 13 to 16 are cross-sectional views illustrating processes of manufacturing a touch detector and a color filter layer according to an embodiment for each process step.

Referring to FIGS. 13 to 16, a method for manufacturing a touch detector and a color filter layer includes: forming the first touch insulating layer TINS1 on the encapsulation layer TFEL; forming the touch driving lines TL1 to TLn, the touch detection lines RL1 to RLn, and at least one guard line GRL on the first touch insulating layer TINS1; and forming the second touch insulating layer TINS2 on the first touch insulating layer TINS1 including the touch driving lines TL1 to TLn, the touch detection lines RL1 to RLn, and at least one guard line GRL.

In addition, the method for manufacturing a touch detector and a color filter layer includes: forming the connection electrodes BE on the second touch insulating layer TINS2; forming the third touch insulating layer TINS3 on the second touch insulating layer TINS2 and the connection electrodes BE; forming a plurality of touch contact holes TCNT1 and a plurality of first and second contact holes TCO1 and TCO2 in the third touch insulating layer TINS3; forming the driving electrodes TE and the detection electrodes RE on the third touch insulating layer TINS3, and connecting the driving electrodes TE to the respective touch driving lines TL1 to TLn; forming the fourth touch insulating layer TINS4 on the driving electrodes TE and the detection electrodes RE; and forming the black matrix BM and the color filter layer CFL on the fourth touch insulating layer TINS4.

Figure 13:
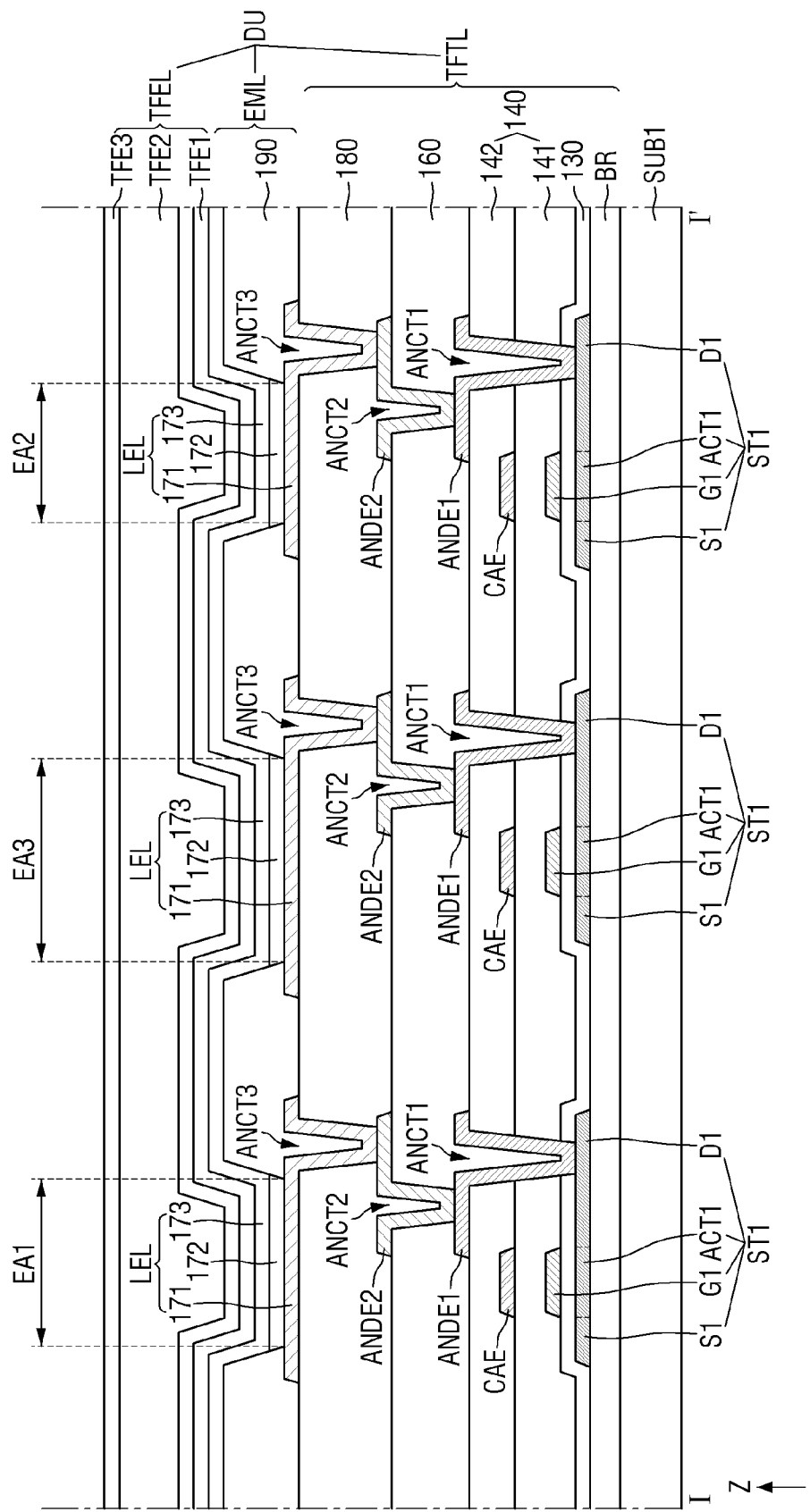
FIGS. 13, 14, 15 and 16 are cross-sectional views illustrating processes of manufacturing a touch detection unit and a color filter layer according to an embodiment for each process step.
Figure 14:
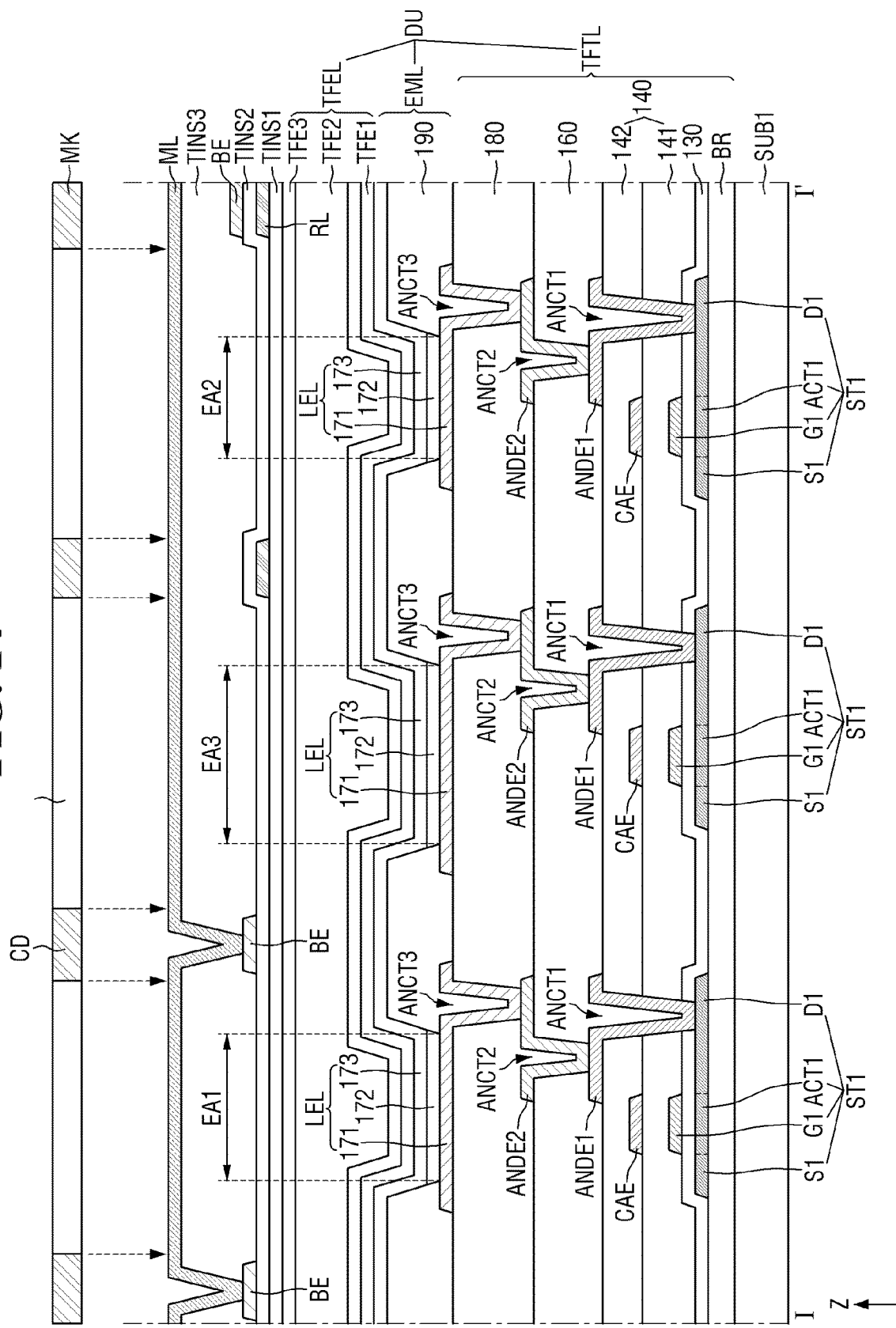

First, referring to FIGS. 13 and 14, the first touch insulating layer TINS1 is formed on the encapsulation layer TFEL. The first insulating material layer may include the material exemplified in the description for the first touch insulating layer TINS1. The first insulating material layer may be coated by a method such as slit coating, spin coating, or gravure printing. For example, the first insulating material layer may be formed using chemical vapor deposition (CVD) that uses a chemical reaction, in one embodiment. In addition, the first insulating material layer may include a photosensitive material.

The touch driving lines TL1 to TLn, the touch detection lines RL1 to RLn, and at least one guard line GRL are formed on the first touch insulating layer TINS1. The touch driving lines TL1 to TLn, the touch detection lines RL1 to RLn, and at least one guard line GRL are formed by coating a photoresist layer on a first conductive metal layer for forming the touch driving lines TL1 to TLn, the touch detection lines RL1 to RLn, and at least one guard line GRL and then performing a patterning process. Specifically, when the touch driving lines TL1 to TLn, the touch detection lines RL1 to RLn, and at least one guard line GRL are formed, the first conductive metal layer is formed by a deposition method such as physical vapor deposition (PVD) or chemical vapor deposition (CVD), and the photoresist layer is coated on the first conductive metal layer. Then, a first photoresist pattern is first formed by performing exposing and developing using a first mask. Then, the first conductive metal layer is etched using the first photoresist pattern as a mask to form the touch driving lines TL1 to TLn, the touch detection lines RL1 to RLn, and at least one guard line GRL. The first conductive metal layer may include the metal material exemplified in the description for the touch driving lines TL1 to TLn, the touch detection lines RL1 to RLn, and at least one guard line GRL.

The second touch insulating layer TINS2 is formed on the first touch insulating layer TINS1 including the touch driving lines TL1 to TLn, the touch detection lines RL1 to RLn, and at least one guard line GRL. The second touch insulating layer TINS2 is formed by coating a second insulating material layer for forming the second touch insulating layer TINS2 on a front surface of the first touch insulating layer TINS1 including the touch driving lines TL1 to TLn, the touch detection lines RL1 to RLn, and at least one guard line GRL. The second insulating material layer may include the material exemplified in the description for the second touch insulating layer TINS2. The second insulating material layer may be coated by a method such as slit coating, spin coating, or gravure printing.

The connection electrodes BE are formed on the second touch insulating layer TINS2. The connection electrodes BE are formed by forming a second conductive metal layer for forming the connection electrodes BE on the second touch insulating layer TINS2, coating a photoresist layer on the second conductive metal layer, and then performing a patterning process. Specifically, when the connection electrodes BE are formed, the second conductive metal layer is deposited, and the photoresist layer is coated on the second conductive metal layer. Then, a second photoresist pattern is first formed by performing exposing and developing using a second mask. Then, the second conductive metal layer is etched using the second photoresist pattern as a mask to form the connection electrodes BE. The second conductive metal layer may include the metal material exemplified in the description for the connection electrode BE.

The third touch insulating layer TINS3 is formed on the second touch insulating layer TINS2 including the connection electrodes BE. The third touch insulating layer TINS3 is formed by coating a third insulating material layer for forming the third touch insulating layer TINS3 on a front surface of the second touch insulating layer TINS2 including the connection electrodes BE. The third insulating material layer may include the material exemplified in the description for the third touch insulating layer TINS3. The third insulating material layer may be coated by a method such as slit coating, spin coating, or gravure printing.

The plurality of touch contact holes TCNT1 and the plurality of first and second contact holes TCO1 and TCO2 are formed in the third touch insulating layer TINS3 by coating a photoresist layer on the third touch insulating layer TINS3, performing exposing and developing using a contact mask for forming contact holes to form a plurality of contact hole forming patterns, selectively etching the third touch insulating layer TINS3 disposed on the connection electrodes BE and the second and third touch insulating layers TINS2 and TINS3 disposed on the touch driving lines TL1 to TLn and the touch detection lines RL1 to RLn using the plurality of contact hole forming patterns as a mask. In this case, the plurality of touch contact holes TCNT1 are formed at positions corresponding to the connection electrodes BE such that portions of front surfaces of the connection electrodes BE are exposed. In addition, the plurality of first contact holes TCO1 are formed at positions corresponding to the touch driving lines TL1 to TLn such that portions of front surfaces of the touch driving lines TL1 to TLn are exposed. In addition, the plurality of second contact holes TCO2 are formed at positions corresponding to the touch detection lines RL1 to RLn such that portions of front surfaces of the touch detection lines RL1 to RLn are exposed.

Figure 15:
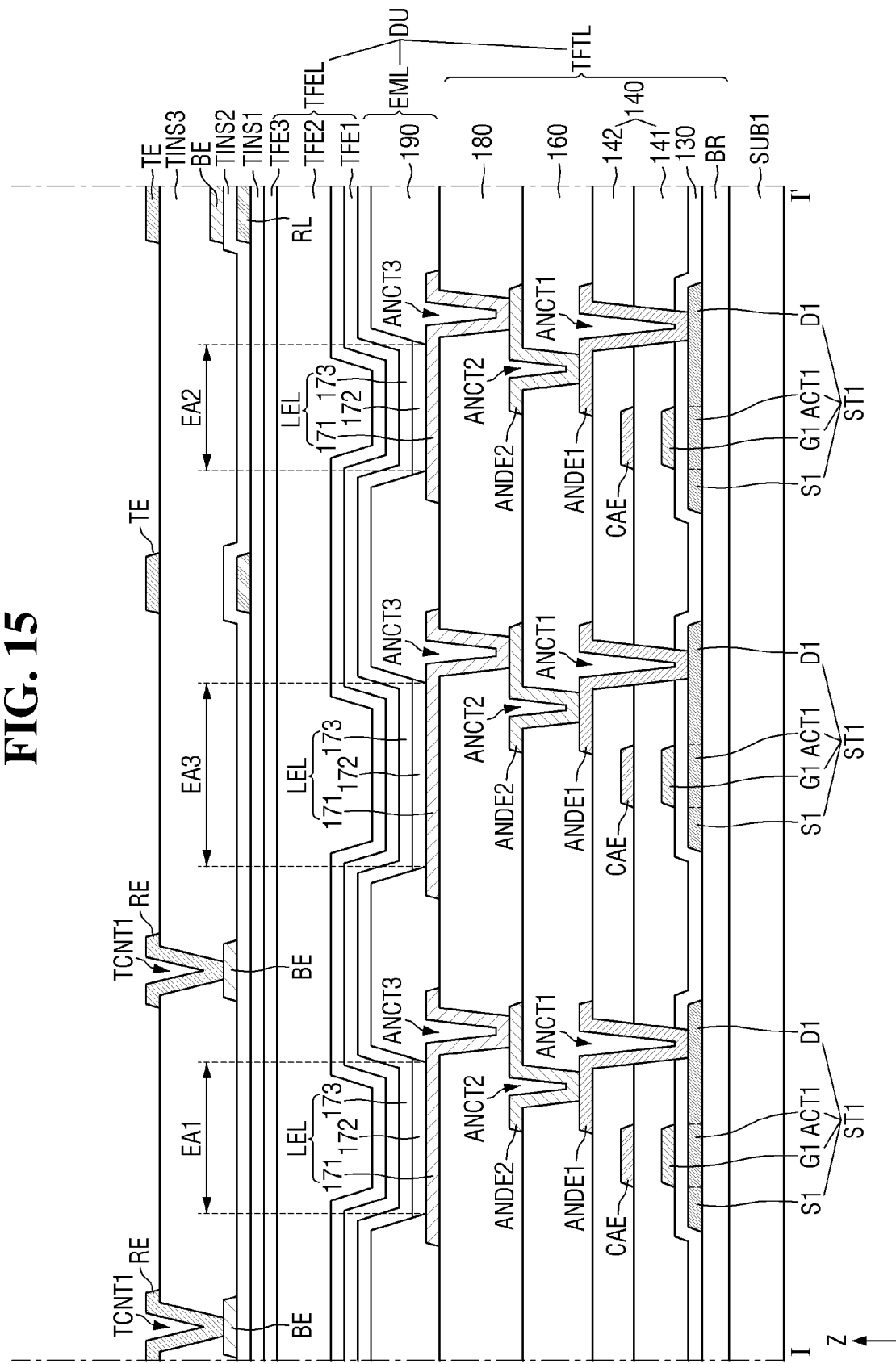
Figure 16:
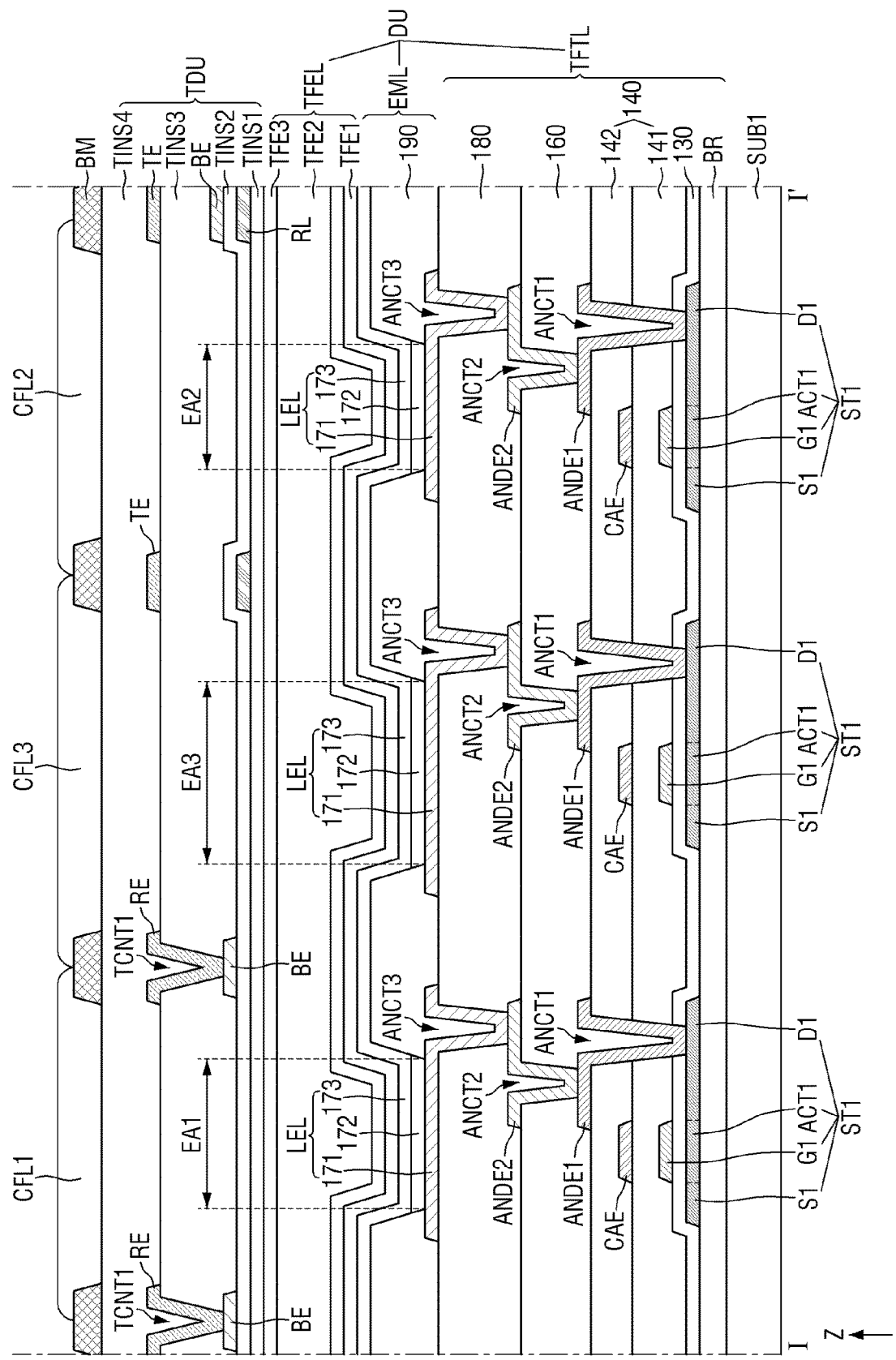

Referring to FIGS. 15 and 16, the driving electrodes TE and the detection electrodes RE are formed on the third touch insulating layer TINS3 in which the plurality of touch contact holes TCNT1 and the plurality of first and second contact holes TCO1 and TCO2 are formed. The driving electrodes TE and the detection electrodes RE may be formed by forming a third conductive metal layer for forming the driving electrodes TE and the detection electrodes RE on a front surface of the third touch insulating layer TINS3 in which the plurality of touch contact holes TCNT1 and the plurality of first and second contact holes TCO1 and TCO2 are formed, coating a photoresist layer, and then performing a patterning process. Specifically, when the driving electrodes TE and the detection electrodes RE are formed, the third conductive metal layer is deposited, the photoresist layer is coated on the third conductive metal layer, and exposing and developing are then performed using a second mask MK on which a light blocking pattern CD and an open pattern OD are formed, thereby forming a third photoresist pattern. Then, the driving electrodes TE and the detection electrodes RE may be formed by etching the third conductive metal layer using the third photoresist pattern as a mask.

After forming the fourth touch insulating layer TINS4, which is a planarization layer, on the third touch insulating layer TINS3, the driving electrodes TE and the detection electrodes RE, the black matrix BM and the color filter layer CFL are formed on the fourth touch insulating layer TINS4. The black matrix (BM) is formed by patterning an organic or inorganic material including a photosensitive organic material, a black pigment and dye. Then, the color filter layer CFL is formed on the fourth touch insulating layer TINS4 using the black matrix BM as a partition wall.

When the color filter layer CFL is formed, a red first color filter CFL1 may be formed by depositing a red liquid-repellent material layer, a green second color filter CFL2 may be formed by depositing a green liquid-repellent material layer, and a blue third color filter CFL3 may be formed by depositing a blue liquid-repellent material layer. The red first color filter CFL1, the green second color filter CFL2 and the blue third color filter CFL3 may be an organic polymer material. The organic polymer material may include, for example, at least one of a hydrophobic fluorinated silane-based promoter, a fluorinated acryl-based monomer, and a fluorinated alkyl-based organic material. The order of forming the red first color filter CFL1, the green second color filter CFL2, and the blue third color filter CFL3 is not limited to that illustrated in FIG. 16.

Figure 17:
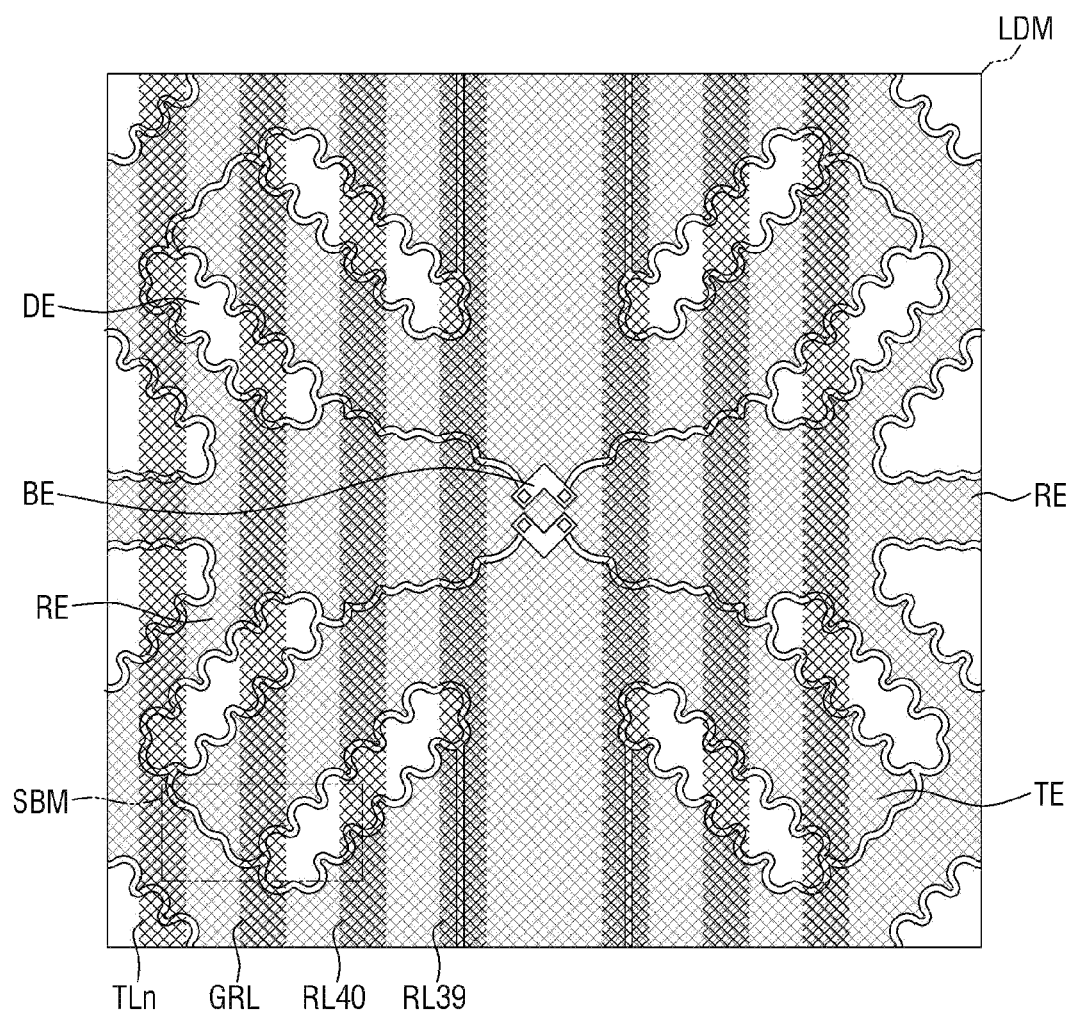
FIG. 17 is a layout diagram illustrating a disposition structure of driving electrodes, detection electrodes, and dummy lines formed above the touch driving lines, touch detection lines, and the guard lines of FIG. 8.

FIG. 17 is a layout diagram illustrating a disposition structure of driving electrodes, detection electrodes, and dummy lines formed above the touch driving lines, touch detection lines, and the guard lines of FIG. 8. In addition, FIG. 18 is a partially enlarged plan view illustrating an area in which the touch driving lines, the guard lines, and the touch detection lines illustrated in FIG. 17 are formed.

Figure 18:
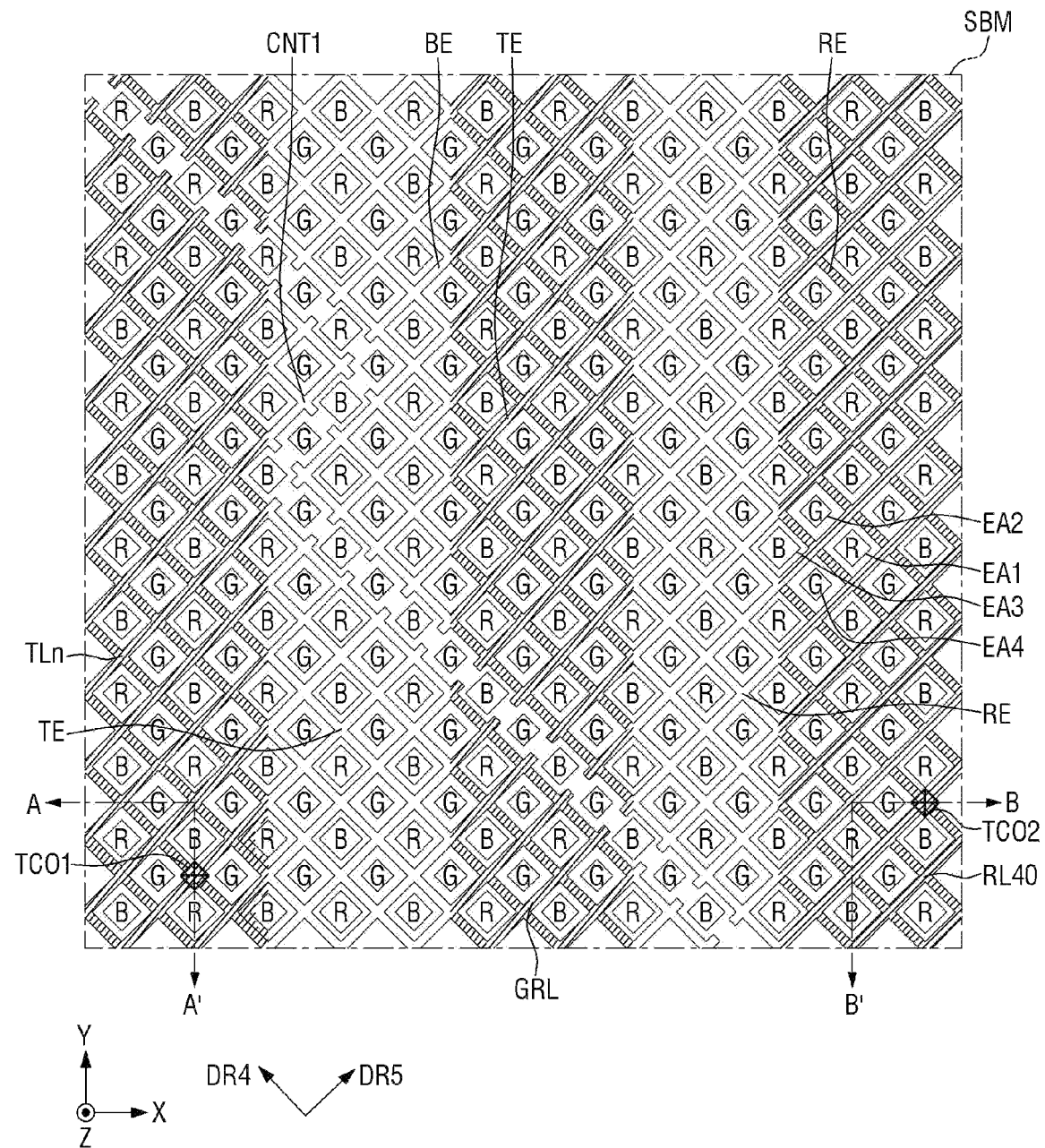
FIG. 18 is a partially enlarged plan view illustrating an area in which the touch driving lines, the guard lines, and the touch detection lines illustrated in FIG. 17 are formed.

As illustrated in FIGS. 17 and 18, when the touch detector TDU of the display panel 100 is formed, the touch driving lines TL1 to TLn, the touch detection lines RL1 to RLn, and at least one guard line GRL are formed in a mesh structure or a net structure in a plan view on a front surface (i.e., the third direction (Z-axis direction)) of the first touch insulating layer TINS1. In addition, the driving electrodes TE and the detection electrodes RE are formed in a size and a shape of a mesh structure or a net structure similar to the touch driving lines TL1 to TLn, the touch detection lines RL1 to RLn, and the guard line GRL on a front surface of the third touch insulating layer TINS3 with the second and third touch insulating layers TINS2 and TINS3 interposed therebetween. Accordingly, similar to the touch driving lines TL1 to TLn, the touch detection lines RL1 to RLn, and at least one guard line GRL, each of the driving electrodes TE, the detection electrodes RE, the connection electrodes BE, and the dummy patterns DE does not overlap the light emitting parts EA1, EA2, EA3, and EA4 of each of the pixels PX.

Referring to FIG. 18, at least one of the driving electrodes TE is connected to any one touch driving line TLn through the first contact hole TCO1. In addition, at least one of the detection electrodes RE is connected to any one of the touch detection lines RL1 to RLn through the second contact hole TCO2.

The first contact hole TCO1 may be formed at any one position of a middle portion of each touch driving line TLn. In addition, the second contact hole TCO2 may be formed at any one position of a middle portion of each touch detection line RLn.

Figure 19:
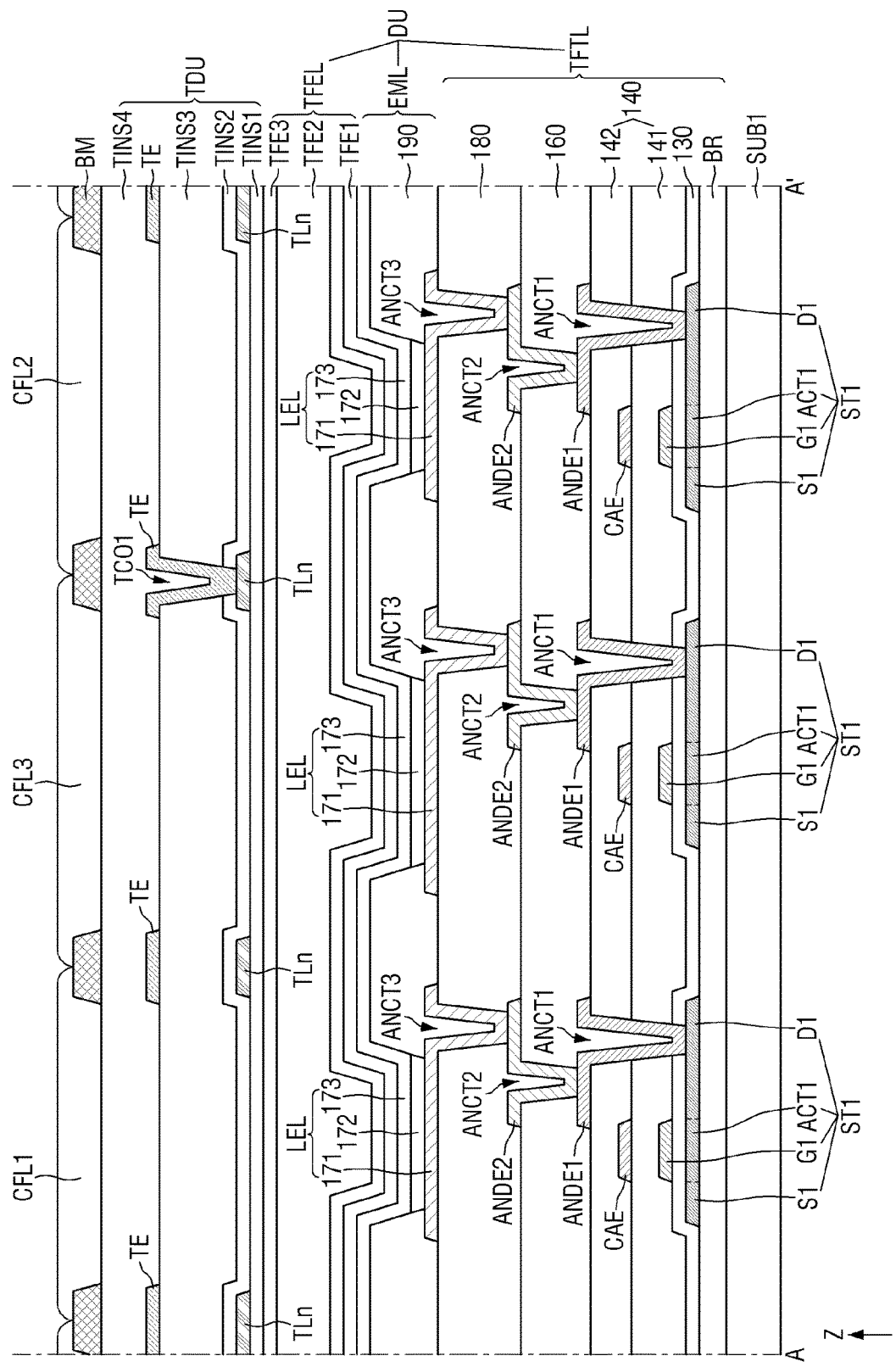
FIG. 19 is a cross-sectional view illustrating an example of the display panel taken along line A-A' of FIG. 18.

FIG. 19 is a cross-sectional view illustrating an example of the display panel taken along line A-A' of FIG. 18.

Referring to FIG. 19, the second touch insulating layer TINS2 is formed to cover all of the touch driving lines TL1 to TLn, the touch detection lines RL1 to RLn, and at least one guard line GRL formed on the first touch insulating layer TINS1, and the third touch insulating layer TINS3 is formed on the second touch insulating layer TINS2 on which the connection electrodes BE is disposed.

A plurality of first contact holes TCO1 may be formed by etching each of the second and third touch insulating layers TINS2 and TINS3 corresponding to front surfaces of the touch driving lines TL1 to TLn. As such, the respective first contact holes TCO1 are formed at positions corresponding to the respective touch driving lines TL1 to TLn such that portions of the front surfaces of the respective touch driving lines TL1 to TLn may be exposed.

When the driving electrodes TE are formed on the third touch insulating layer TINS3 in which the first and second contact holes TCO1 and TCO2 are formed, the driving electrodes TE may be connected to the respective touch driving lines TL1 to TLn in a one-to-one manner on the third touch insulating layer TINS3.

The driving electrodes TE and the detection electrodes RE overlap the touch driving lines TL1 to TLn and the touch detection lines RL1 to RLn with the second and third touch insulating layers TINS2 and TINS3 interposed therebetween. Accordingly, as a thickness of at least one of the second and third touch insulating layers TINS2 and TINS3 increases, noise of the driving electrodes TE and the detection electrodes RE overlapping the touch driving lines TL1 to TLn and the touch detection lines RL1 to RLn may decrease. Accordingly, the thickness of at least one of the second and third touch insulating layers TINS2 and TINS3 may be greater than a thickness of the first and fourth touch insulating layers TINS1 and TINS4. In addition, at least one of the second and third touch insulating layers TINS2 and TINS3 may be formed as an inorganic film.

Figure 20:
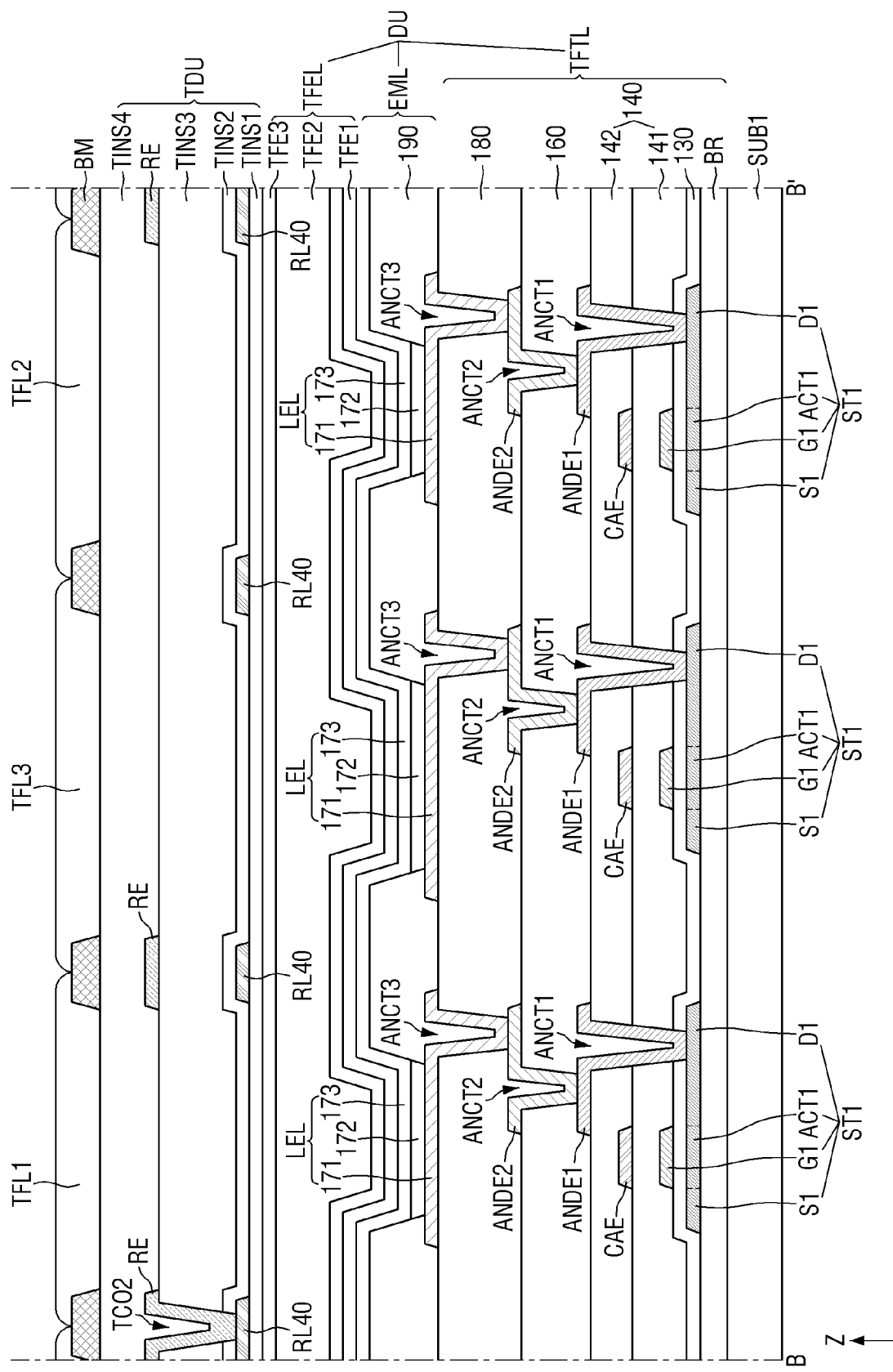
FIG. 20 is a cross-sectional view illustrating an example of the display panel taken along line B-B' of FIG. 18.

FIG. 20 is a cross-sectional view illustrating an example of the display panel taken along line B-B' of FIG. 18.

Referring to FIG. 20, a plurality of second contact holes TCO2 may be formed by etching each of the second and third touch insulating layers TINS2 and TINS3 corresponding to front surfaces of the touch detection lines RL1 to RLn. As such, the respective second contact holes TCO2 are formed at positions corresponding to the respective touch detection lines RL1 to RLn such that portions of the front surfaces of the respective touch detection lines RL1 to RLn may be exposed.

When the detection electrodes RE are formed on the third touch insulating layer TINS3 in which the first and second contact holes TCO1 and TCO2 are formed, the detection electrodes RE may be connected to the respective touch detection lines RL1 to RLn in a one-to-one manner on the third touch insulating layer TINS3.

The driving electrodes TE and the detection electrodes RE overlap the touch driving lines TL1 to TLn and the touch detection lines RL1 to RLn with the second and third touch insulating layers TINS2 and TINS3 interposed therebetween. Accordingly, as a thickness of at least one of the second and third touch insulating layers TINS2 and TINS3 increases, interference between the touch driving lines TL1 to TLn and the driving electrodes TE and noise due to the interference may decrease. In addition, noise between the touch detection lines RL1 to RLn and the detection electrodes RE may decrease. However, as the thicknesses of the second and third touch insulating layers TINS2 and TINS3 increase, luminous efficiency and touch detection efficiency may decrease, and thus, the thicknesses of the second and third touch insulating layers TINS2 and TINS3 need to be efficiently set according to experimental values.

Figure 21:
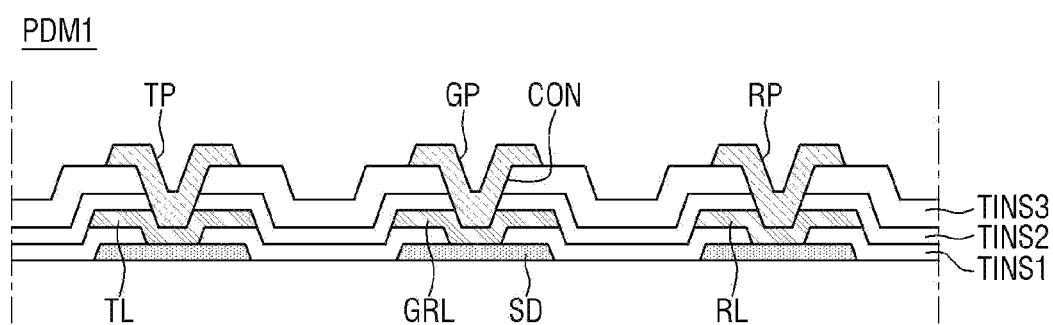
FIG. 21 is a cross-sectional view illustrating a portion of a first pad part illustrated in FIG. 5.

FIG. 21 is a cross-sectional view illustrating a portion of a first pad part illustrated in FIG. 5.

Referring to FIG. 21, at least one guard pad GP to which the guard line GRL is connected, detection signal pads RP to which the touch detection lines RL are connected, and driving signal pads TP to which the touch driving lines TL are connected are formed in each of the pad parts PDM1 and PDM2.

Each of the pad parts PDM1 and PDM2 may be formed together with the touch detector TDU through the same process when the touch detector TDU is formed.

Specifically, when each of the pad parts PDM1 and PDM2 is formed, a first touch insulating layer TINS1 is first formed on a base layer including pad electrodes SD. Then, in a process of patterning the touch driving lines TL1 to TLn, the touch detection lines RL1 to RLn, and at least one guard line GRL in the touch detector TDU, the touch driving lines TL1 to TLn, the touch detection lines RL1 to RLn, and at least one guard line GRL are formed to be connected to each of the pad parts PDM1 and PDM2.

Thereafter, second and third touch insulating layers TINS2 and TINS3 are also formed on each of the pad parts PDM1 and PDM2 by the same process as the touch detector TDU. Then, in a process of forming the plurality of touch contact holes TCNT1 and the plurality of first and second contact holes TCO1 and TCO2 in the second and third touch insulating layers TINS2 and TINS3, contact holes CON are also formed in each of the pad parts PDM1 and PDM2. In a process of forming the driving electrodes TE and the detection electrodes RE on the third touch insulating layer TINS3 using the third conductive metal layer, the third conductive metal layer may also be deposited and patterned in each of the pad parts PDM1 and PDM2 to form the guard pad GP connected to the guard line GRL, the detection signal pads RP connected to the touch detection lines RL, and the driving signal pads TP connected to the touch driving lines TL. As such, each of the pad parts PDM1 and PDM2 may be formed in the process of forming the touch detector TDU such that processes of manufacturing a touch detection device may be simplified.

In concluding the detailed description, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A touch detection device comprising:
   touch driving lines on a first touch insulating layer;
   touch detection lines on the first touch insulating layer in a touch detection area;
   connection electrodes on the first touch insulating layer;
   a second touch insulating layer on the touch detection lines and the connection electrodes;
   driving electrodes disposed on the second touch insulating layer and connected to any one of touch driving lines;
   detection electrodes disposed on the second touch insulating layer and connected to any one of the touch detection lines through a contact hole formed through the second touch insulating layers;
   a third touch insulating layer formed on the second touch insulating layer on which the driving electrode and the detection electrode are disposed;
   light emitting parts disposed under the touch detection area, and
   a black matrix and color filters disposed on the third touch insulating layer,
   wherein the detection electrodes are connected to the connection electrodes through a touch contact hole formed through the second touch insulating layer,
   wherein the black matrix, the connection electrodes, the driving electrodes and the detection electrodes are formed in the mesh structure in a plan view,
   wherein the black matrix overlaps partial areas of the touch detection lines, the driving electrodes, the detection electrodes, and the connection electrodes, and
   wherein the color filters are disposed on the light emitting parts and are overlapped with the light emitting parts in the plan view.

2. The touch detection device of claim 1, wherein the detection electrodes overlap the touch detection lines in the plan view with the second touch insulating layer interposed therebetween.

3. The touch detection device of claim 2, wherein one ends of the touch driving lines are connected to the driving electrodes and the other ends of the touch driving lines are connected to at least one pad part, and one ends of the touch detection lines are connected to the detection electrodes and the other ends of the touch detection lines are connected to the at least one pad part.

4. The touch detection device of claim 3, wherein the at least one pad part includes a plurality of pad electrodes formed on a substrate, the touch driving lines are connected to driving pads among the plurality of pad electrodes through contact holes formed in the first touch insulating layer, respectively, the touch detection lines are connected to detection pads among the plurality of pad electrodes through contact holes formed in the first touch insulating layer, respectively.

5. The touch detection device of claim 4, wherein a thickness of at least one of the first touch insulating layer and the second touch insulating layer is greater than a thickness of the third touch insulating layer.

6. The touch detection device of claim 5, wherein at least one of the first touch insulating layer and the second touch insulating layer is formed as an inorganic film including at least one of a silicon nitride layer, a silicon oxynitride layer, a silicon oxide layer, a titanium oxide layer, and an aluminum oxide layer.

7. The touch detection device of claim 4, wherein at least one of the first touch insulating layer and the second touch insulating layer is formed as an inorganic film including at least one of a silicon nitride layer, a silicon oxynitride layer, a silicon oxide layer, a titanium oxide layer, and an aluminum oxide layer.

* * * * *